United States Patent
Nomura

(10) Patent No.: US 12,154,305 B2
(45) Date of Patent: Nov. 26, 2024

(54) INFORMATION PROCESSING APPARATUS AND INFORMATION PROCESSING METHOD

(71) Applicant: SONY GROUP CORPORATION, Tokyo (JP)

(72) Inventor: Naoki Nomura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/767,394

(22) PCT Filed: Oct. 2, 2020

(86) PCT No.: PCT/JP2020/037531
§ 371 (c)(1),
(2) Date: Apr. 7, 2022

(87) PCT Pub. No.: WO2021/075280
PCT Pub. Date: Apr. 22, 2021

(65) Prior Publication Data
US 2024/0078007 A1      Mar. 7, 2024

(30) Foreign Application Priority Data
Oct. 17, 2019   (JP) ................................ 2019-190231

(51) Int. Cl.
*G06V 10/10* (2022.01)
*B43L 1/04* (2006.01)
*G06F 3/04883* (2022.01)

(52) U.S. Cl.
CPC ............... *G06V 10/10* (2022.01); *B43L 1/04* (2013.01); *G06F 3/04883* (2013.01)

(58) Field of Classification Search
CPC ........ G06F 3/04883; B43L 1/04; G06V 10/10
See application file for complete search history.

(56) References Cited

U.S. PATENT DOCUMENTS

| 9,706,168 B1 | 7/2017 | Ludwig | |
|---|---|---|---|
| 2015/0373283 A1* | 12/2015 | Hayashi | G06T 3/4038 |
| | | | 348/239 |

(Continued)

FOREIGN PATENT DOCUMENTS

| CN | 106919333 A | 7/2017 |
|---|---|---|
| JP | 11-353459 A | 12/1999 |

(Continued)

OTHER PUBLICATIONS

International Search Report and Written Opinion of PCT Application No. PCT/JP2020/037531, issued on Dec. 22, 2020, 09 pages of ISRWO.

*Primary Examiner* — Quoc A Tran
(74) *Attorney, Agent, or Firm* — CHIP LAW GROUP

(57) ABSTRACT

Provided is an information processing apparatus and an information processing method that enable appropriate recording of information written on a writing object. A region setting unit sets, in a writing image that shows the writing object on which written information is written, a writing region that includes the written information, and a recording control unit that controls recording of the writing image in response to a change in the writing region. The present disclosure can be applied to, for example, a board writing recording system.

16 Claims, 23 Drawing Sheets

(56) References Cited

U.S. PATENT DOCUMENTS

| | | |
|---|---|---|
| 2016/0012295 A1 | 1/2016 | Imoto et al. |
| 2017/0092333 A1 | 3/2017 | Li |
| 2018/0108121 A1 | 4/2018 | McCaughan |
| 2018/0276510 A1 | 9/2018 | Inomata |
| 2021/0076105 A1* | 3/2021 | Parmar .......... H04N 21/234336 |
| 2022/0019346 A1* | 1/2022 | Fan ..................... G06F 3/04886 |
| 2022/0121354 A1* | 4/2022 | Xia ..................... G06F 3/04847 |

FOREIGN PATENT DOCUMENTS

| | | | |
|---|---|---|---|
| JP | 2005-125628 A | 5/2005 | |
| JP | 2011123895 A | 6/2011 | |
| JP | 2015109612 A | 6/2015 | |
| JP | 2016009266 A * | 1/2016 | ............. G06F 3/017 |
| JP | 2016-019138 A | 2/2016 | |
| JP | 2016103798 A | 6/2016 | |
| JP | 2019212000 A | 12/2019 | |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/037531 filed on Oct. 2, 2020, which claims priority benefit of Japanese Patent Application No. JP 2019-190231 filed in the Japan Patent Office on Oct. 17, 2019. Each of the above-referenced applications is hereby incorporated herein by reference in its entirety.

TECHNICAL FIELD

The present disclosure relates to an information processing apparatus, an information processing method, and a program, and more particularly, to an information processing apparatus, an information processing method, and a program that allow for appropriate recording of information written on a writing object.

BACKGROUND ART

In general, meetings and lectures often proceed while information is written and erased on a writing object such as a blackboard or a whiteboard.

It is highly convenient to record information written on a writing object so that the information can be referred to later. On the other hand, constantly recording the information can be a waste of storage capacity. Thus, there is a demand for a technology for efficiently recording information written on a writing object.

For example, Patent Document 1 discloses a technology in which information on a blackboard is imaged by a digital camera when a writing person holds (e.g., picks up) a blackboard eraser, so that the information written on the blackboard is recorded before the information on the blackboard is deleted.

CITATION LIST

Patent Document

Patent Document 1: Japanese Patent Application Laid-Open No. 2005-125628

SUMMARY OF THE INVENTION

Problems to be Solved by the Invention

However, with the technology disclosed in Patent Document 1, there has been a possibility that information written on a writing object cannot be appropriately recorded.

The present disclosure has been made in view of such a situation, and is intended to enable appropriate recording of information written on a writing object.

Solutions to Problems

The present disclosure provides an information processing apparatus including: a region setting unit that sets, in a writing image that shows a writing object on which written information is written, a writing region that includes the written information; and a recording control unit that controls recording of the writing image in response to a change in the writing region.

The present disclosure provides an information processing method performed by an information processing apparatus or a program for causing a computer to execute processing including: setting, in a writing image that includes written information written on a writing object, a writing region that includes the written information; and controlling recording of the writing image in response to a change in the writing region.

In the present disclosure, in a writing image that includes written information written on a writing object, a writing region that includes the written information is set, and recording of the writing image is controlled in response to a change in the writing region.

MODE FOR CARRYING OUT THE INVENTION

Figure 1:
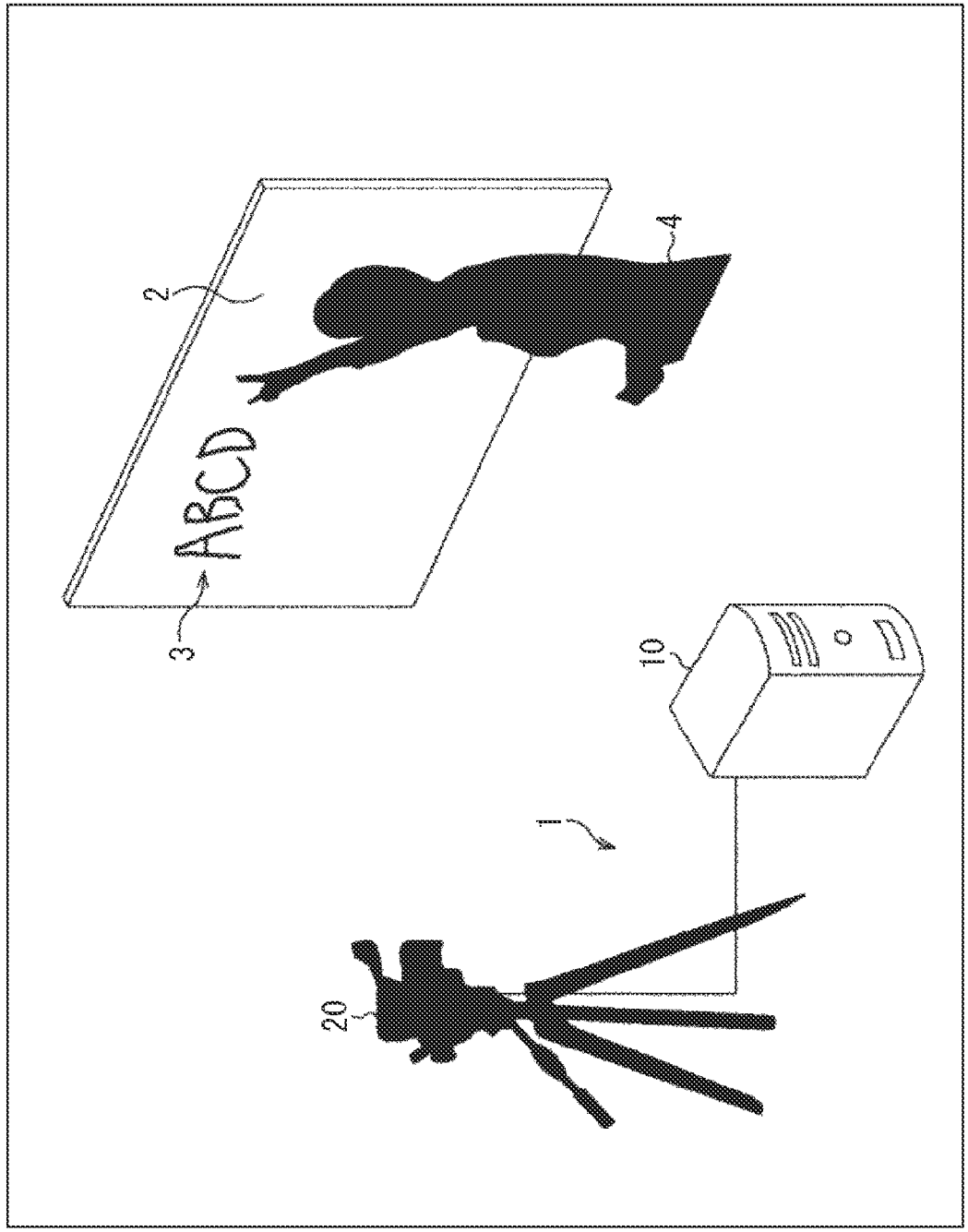
FIG. 1 is a diagram illustrating an outline of a board writing recording system according to an embodiment of the present disclosure.

A mode for carrying out the present disclosure (hereinafter referred to as an "embodiment") will be described below. Note that the description will be made in the order below.
1. Outline of board writing recording system
2. Configuration example of board writing recording system
3. Flow of board writing recording processing
3-1. Details of recording control in accordance with mode
3-2. Example of mode transition
4. Another configuration example of board writing recording system
5. Flow of board writing recording processing
5-1. Masking of recorded region
5-2. Recording control in accordance with board writing left undeleted time
6. Configuration example of computer 1. Outline of Board Writing Recording System FIG. 1 is a diagram illustrating an outline of a board writing recording system according to the present embodiment.

As illustrated in FIG. 1, a board writing recording system 1 includes an information processing apparatus 10 and an input device 20 connected to the information processing apparatus 10.

A writing object 2 is an object on which visual information (hereinafter referred to as written information 3) such as a dot, a line, a character, a sentence, a mathematical formula, a symbol, a picture, a figure, or an image is written.

The writing object 2 is constituted by a blackboard, a whiteboard, an electronic paper, a touch panel, or the like. The written information 3 is written on the writing object 2 with a chalk, a marker, a stylus, a finger, or the like, and is erased from the writing object 2 with a blackboard eraser, an eraser, or the like.

A writing person 4 is a person who performs an operation on the writing object 2.

The writing person 4 writes the written information 3 on the writing object 2, and erases the written information 3 written on the writing object 2. For example, in a lecture or a meeting, the writing person 4 gives a description about the written information 3 while pointing the written information 3 written on the writing object 2 with a hand, a laser pointer, a pointer, or the like.

The input device 20 is a device for inputting information regarding a physical space in which the input device 20 is installed. The input device 20 includes, for example, an imaging device and an audio input device.

The imaging device includes a lens system constituted by an imaging lens, a diaphragm, a zoom lens, a focus lens, and the like, a drive system that causes the lens system to perform a focus operation or a zoom operation, and an image sensor that performs photoelectric conversion of imaging light obtained by the lens system to generate an imaging signal.

The audio input device includes a microphone that collects ambient sound, a microphone amplifier circuit that amplifies an audio signal obtained by the microphone, an A/D converter, and a signal processing circuit such as a noise canceller.

The input device 20 outputs image data converted into a digital signal and audio data at the time of imaging.

The input device 20 can capture an image of an object in the physical space as an imaging target. In the present embodiment, the input device 20 captures an image of the writing object 2 as an imaging target on which the written information 3 is written, and outputs the time of imaging and the acquired image associated with each other to the information processing apparatus 10.

Note that the image acquired by the imaging may include other than the writing object 2. In that case, the input device 20 outputs an image extracted from the image acquired by the imaging to the information processing apparatus 10. For example, an image obtained by extracting a region where the writing object 2 is reflected from the image acquired by the imaging is output to the information processing apparatus 10.

Furthermore, a function as the input device 20 may be included in the writing object 2. For example, the input device 20 and the writing object 2 are configured as an electronic blackboard that acquires and outputs an image by scanning the state of the writing object 2. In this case, the input device 20 acquires an image of the writing object 2, and outputs the time of acquisition and the acquired image associated with each other to the information processing apparatus 10.

The image input by the input device 20 may be a moving image. The moving image is data that includes a plurality of still images (image data) and the time of reproduction (corresponding to the time of imaging) of each still image. In a case where the moving image is reproduced, the still images are sequentially reproduced in the order of time of reproduction. The still images that constitute the moving image are also referred to as frames. The number of frames per unit time is also called a frame rate, and is expressed by the number of frames per second (FPS).

Furthermore, the image input by the input device 20 may be a still image. In that case, the input device 20 sequentially inputs images. In the present specification, the number of images input per unit time is also referred to as a frame rate after the fashion of the moving image.

In the following, an image of the writing object 2 on which the written information 3 is written, which is input by the input device 20, is referred to as a writing image or a board writing image. The board writing image is assumed to be a still image. In a case where an image input by the input device 20 is a moving image, the board writing image is one still image constituting the moving image.

The information processing apparatus 10 selectively records a board writing image to be recorded among board writing images input by the input device 20. As used herein, recording means storing information in a storage medium. The information processing apparatus 10 monitors a board writing image, and records the board writing image when detecting a change in the written information 3 written on the writing object 2. A board writing image that is selectively recorded on the basis of a change in written information is hereinafter also referred to as a recorded image.

The change in the written information 3 may be erasure of the written information 3. In that case, the information processing apparatus 10 records the board writing image before the start of erasing as a recorded image. Typically, the largest amount of the written information 3 is written on the writing object 2 before the start of erasing the written information 3. It is therefore possible to selectively record the board writing image before the start of erasing so that unnecessary recording is suppressed and board writing images are efficiently recorded.

The change in the written information 3 may be writing (that is, addition) of the written information 3. In that case, the information processing apparatus 10 records a board writing image after completion of the addition as a recorded image. Typically, the largest amount of the written information 3 is written on the writing object 2 after completion of the addition of the written information 3. It is therefore possible to selectively record the board writing image after completion of the addition so that unnecessary recording is suppressed and board writing images are efficiently recorded.

2. Configuration Example of Board Writing Recording System

Figure 2:
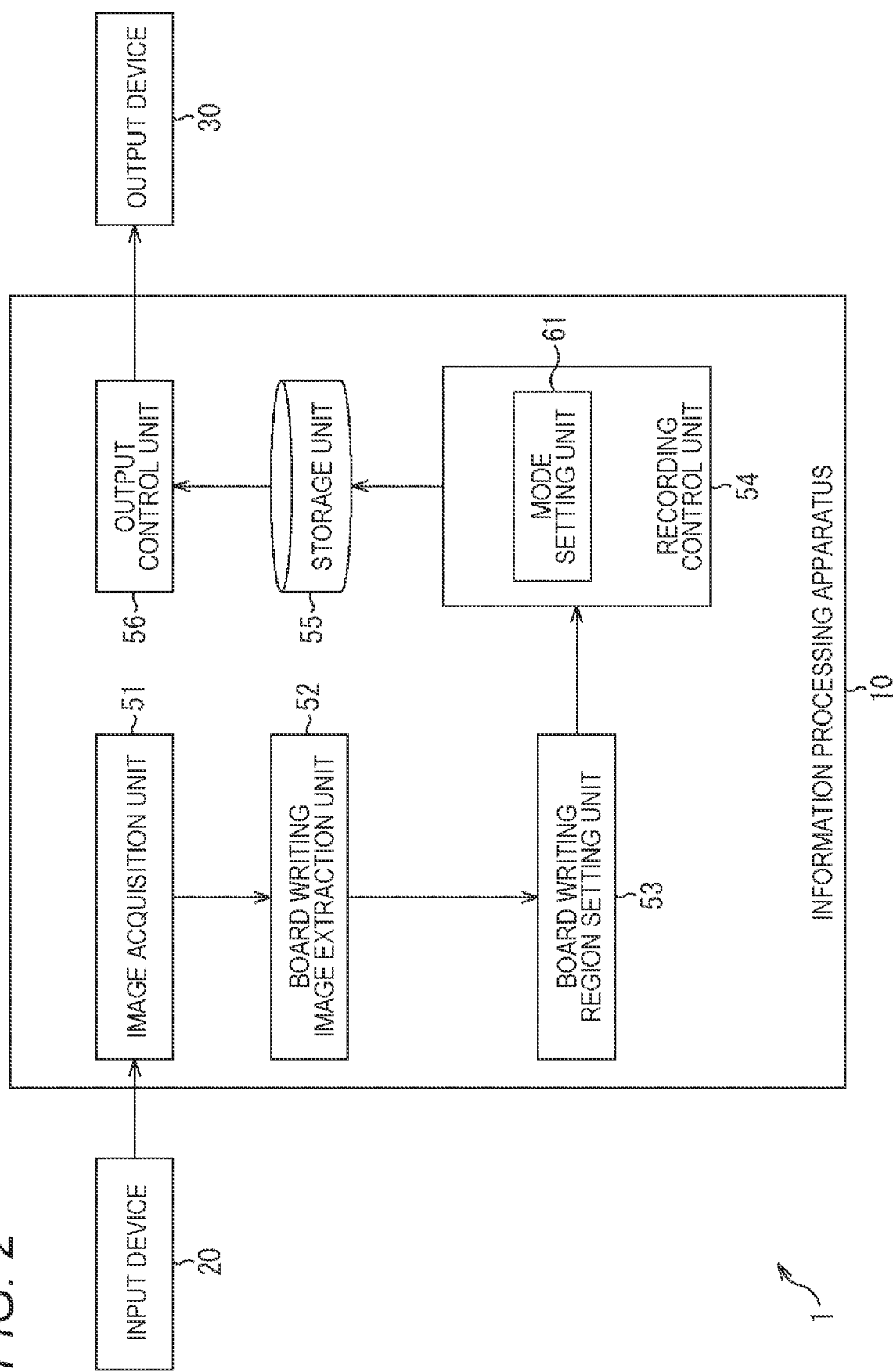
FIG. 2 is a block diagram illustrating a functional configuration example of the board writing recording system.

FIG. 2 is a block diagram illustrating a functional configuration example of the board writing recording system 1.

The board writing recording system 1 in FIG. 2 includes the information processing apparatus 10, the input device 20, and an output device 30.

As described above, the input device 20 sequentially inputs board writing images, and outputs each of the board writing images to the information processing apparatus 10.

The output device 30 is a device that outputs information under the control of the information processing apparatus 10.

The output device 30 is constituted by a display device such as a liquid crystal display device, a plasma display device, an organic electro-luminescence (EL) display device, a laser projector, a light emitting diode (LED) projector, and a lamp.

The output device 30 displays a board writing image (recorded image) so that, for example, students who are taking a lecture in a lecture room and viewers who are viewing the lecture in a distant classroom can see in real time the written information 3 written on the writing object 2.

The information processing apparatus 10 is a device that controls the operation of the entire board writing recording system 1. The information processing apparatus 10 is constituted by an optional device such as a personal computer (PC), a smartphone, a tablet terminal, or dedicated equipment.

As illustrated in FIG. 2, the information processing apparatus 10 includes an image acquisition unit 51, a board writing image extraction unit 52, a board writing region setting unit 53, a recording control unit 54, a storage unit 55, and an output control unit 56.

The image acquisition unit 51 acquires, for example, images in units of frames input by the input device 20, and supplies the images to the board writing image extraction unit 52.

The board writing image extraction unit 52 extracts, as a board writing image, a region where the writing object 2 is reflected from an image from the image acquisition unit 51. The extracted board writing image is supplied to the board writing region setting unit 53.

The board writing region setting unit 53 sets a writing region, which is a region that includes the written information 3, in the board writing image (writing image) showing the writing object 2. The writing region is a region that indicates the proportion of the range where the written information 3 is written to the entire writing object 2. The writing region is hereinafter also referred to as a board writing region. The board writing image in which the board writing region has been set is supplied to the recording control unit 54.

The recording control unit 54 controls recording of the board writing image in the storage unit 55 in response to a change in the writing region in board writing images in units of frames, specifically, depending on whether the board writing region has increased or reduced.

The recording control unit 54 includes a mode setting unit 61. The mode setting unit 61 sets a board writing state mode that indicates the state of change in the written information 3 in the board writing image (the writing object 2). The board writing state mode includes a "writing on board" mode, which indicates a state in which the written information 3 is being written (added) on the writing object 2, and an "erasing from board" mode, which indicates a state in which the written information 3 is being erased from the writing object 2.

The recording control unit 54 controls recording of the board writing image in the storage unit 55 in accordance with the board writing state mode set by the mode setting unit 61.

The storage unit 55 records the board writing image as a recorded image under the control of the recording control unit 54.

The output control unit 56 generates output information on the basis of the board writing image stored in the storage unit 55, and causes the output device 30 to output the output information.

3. Flow of Board Writing Recording Processing

Figure 3:
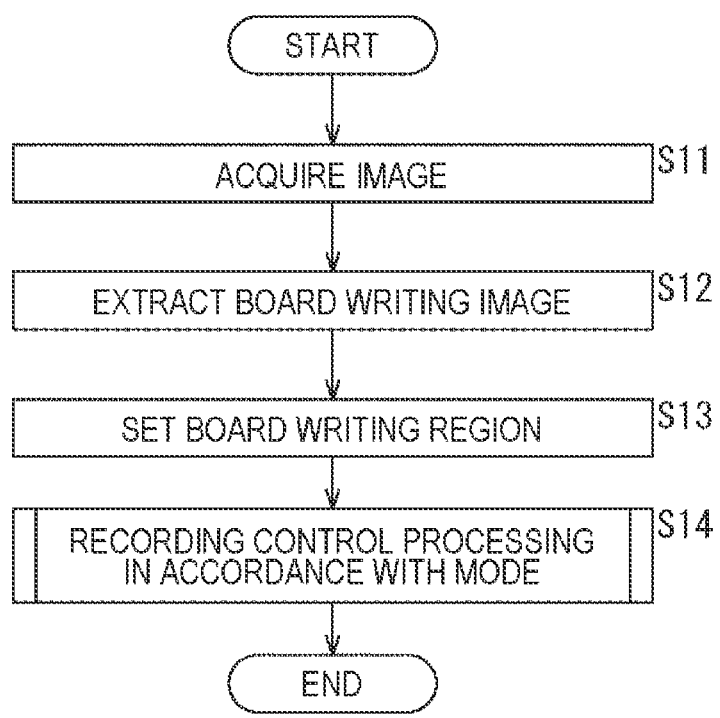
FIG. 3 is a flowchart illustrating a flow of board writing recording processing.

Next, a flow of board writing recording processing by the board writing recording system 1 will be described with reference to a flowchart in FIG. 3. The processing in FIG. 3 is executed for each frame of the image input from the input device 20.

In step S11, the image acquisition unit 51 acquires an image input from the input device 20.

Figure 4:
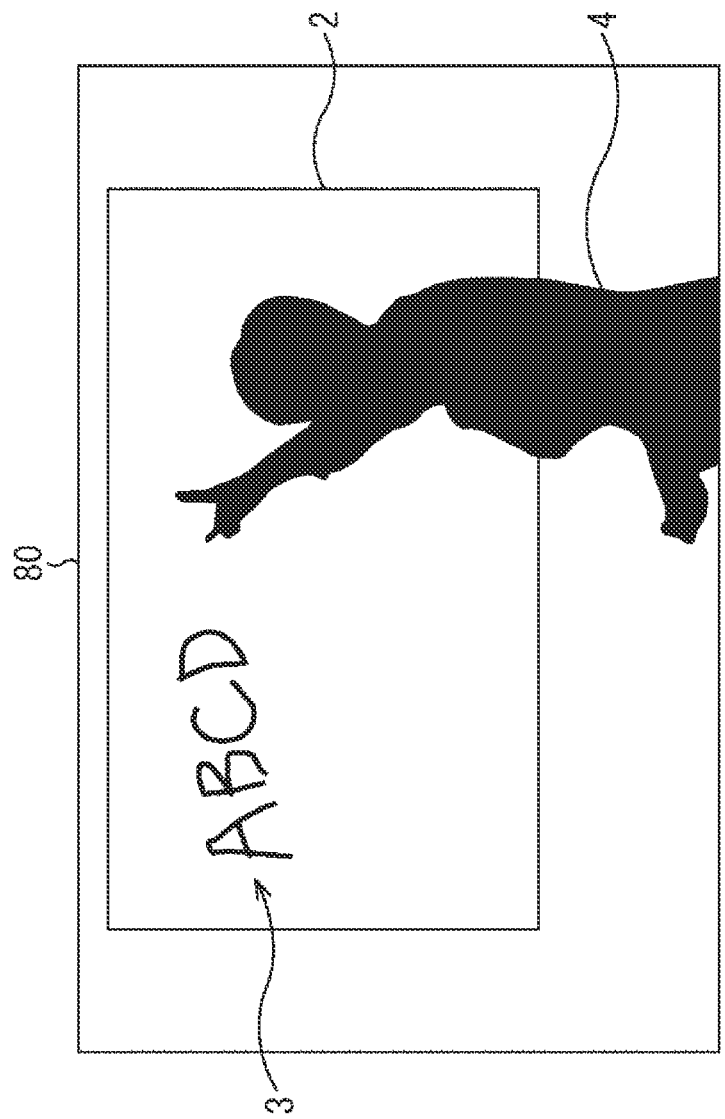
FIG. 4 is a diagram illustrating an example of a captured image.

FIG. 4 illustrates an example of a captured image input from the input device 20. In a captured image 80 illustrated in FIG. 4, the writing object 2 on which the written information 3 is written and the writing person 4 are reflected. The captured image 80 may be one frame of a moving image, or may be a still image.

In a case where the writing object 2 appears small or adjustment of white balance is not appropriate in the captured image 80, there is a possibility that an error occurs in determination of addition or erasure of the written information 3. Thus, in the captured image 80, the writing object 2 is made to appear sufficiently large, and the written information 3 written on the writing object 2 is made to appear in a color close to a shade of color seen with a naked eye.

In step S12, the board writing image extraction unit 52 extracts a board writing image from the captured image acquired by the image acquisition unit 51. The extraction of the board writing image may be performed automatically or manually.

Figure 5:
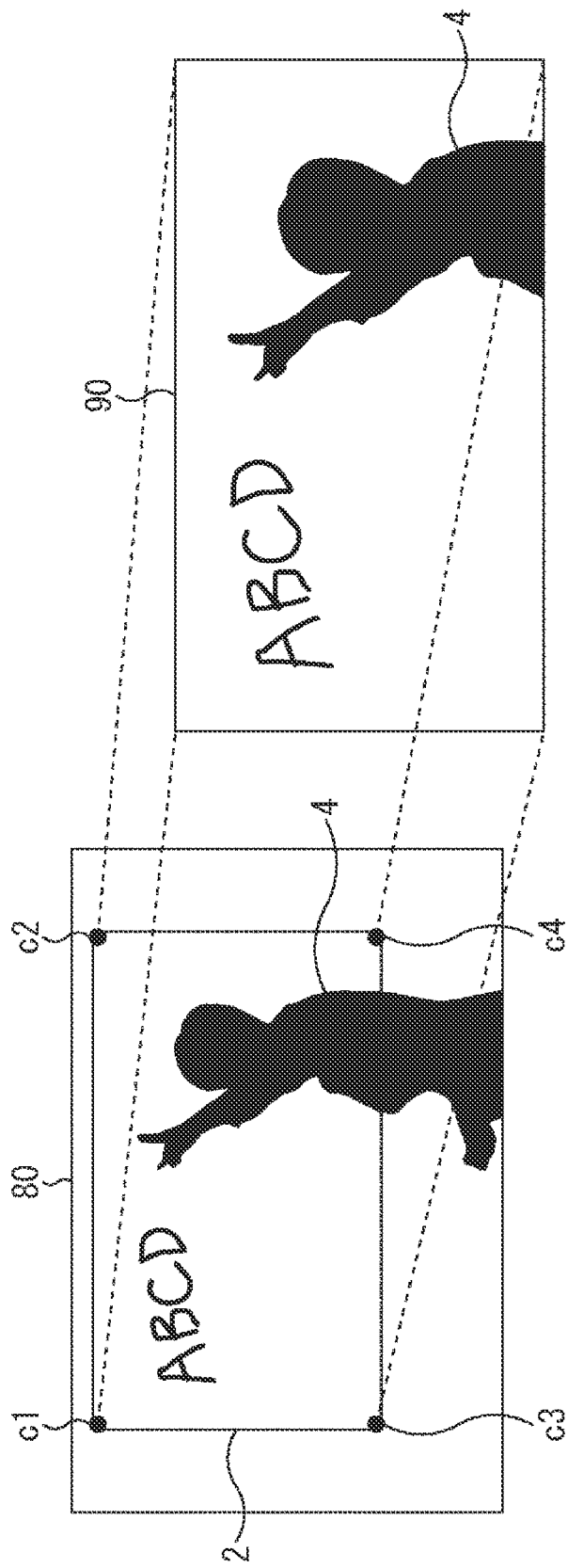
FIG. 5 is a diagram illustrating extraction of a board writing image.

In a case where the board writing image is manually extracted, as illustrated in FIG. 5, four points c1, c2, c3, and c4 at four corners of the writing object 2 are designated in the captured image 80, so that the region of the writing object 2 is specified, and a board writing image 90 is extracted by projective transformation of the four points c1 to c4.

Figure 6:
FIG. 6 is a diagram illustrating extraction of a board writing image.

Next, the shape of the writing person 4 is recognized in the board writing image 90, and the region where the writing person 4 is reflected is excluded, so that the board writing image 90 in which only the writing object 2 is reflected as illustrated in FIG. 6 is obtained. As a technique for removing the region where the writing person 4 is reflected from the board writing image 90, a technology such as moving object removal is used. Alternatively, another technology may be used.

Figure 7:
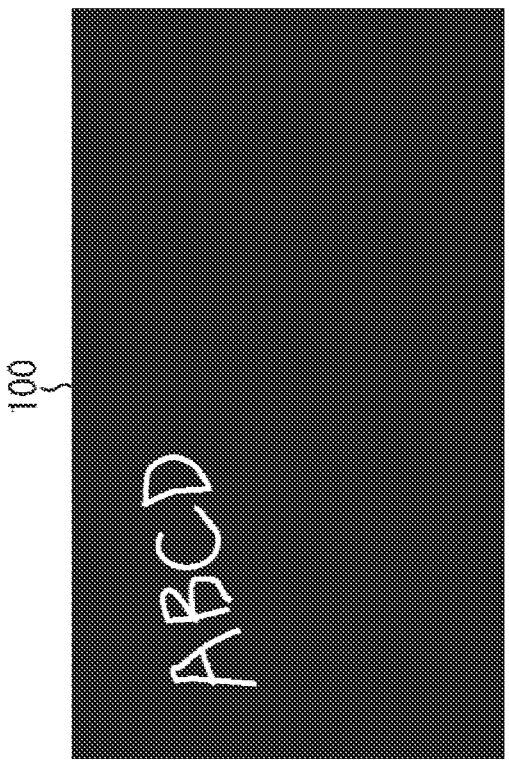
FIG. 7 is a diagram illustrating an example of a board writing image.

Moreover, the board writing image 90 from which the writing person 4 has been removed is subjected to binarization processing, in which pixels where the written information 3 is written in the writing object 2 are converted into white (e.g., 1), and the remaining pixels are converted into black (e.g., 0). With this arrangement, a binarized image constituted by black pixels and white pixels as illustrated in FIG. 7 is obtained as a board writing image 100.

In step S13, the board writing region setting unit 53 sets a board writing region in the board writing image extracted by the board writing image extraction unit 52.

Specifically, the board writing region setting unit 53 sets the board writing region by performing expansion processing on the written information 3 in the board writing image. Moreover, the board writing region setting unit 53 performs resolution reduction processing on the board writing image in which the board writing region has been set.

Figure 8:
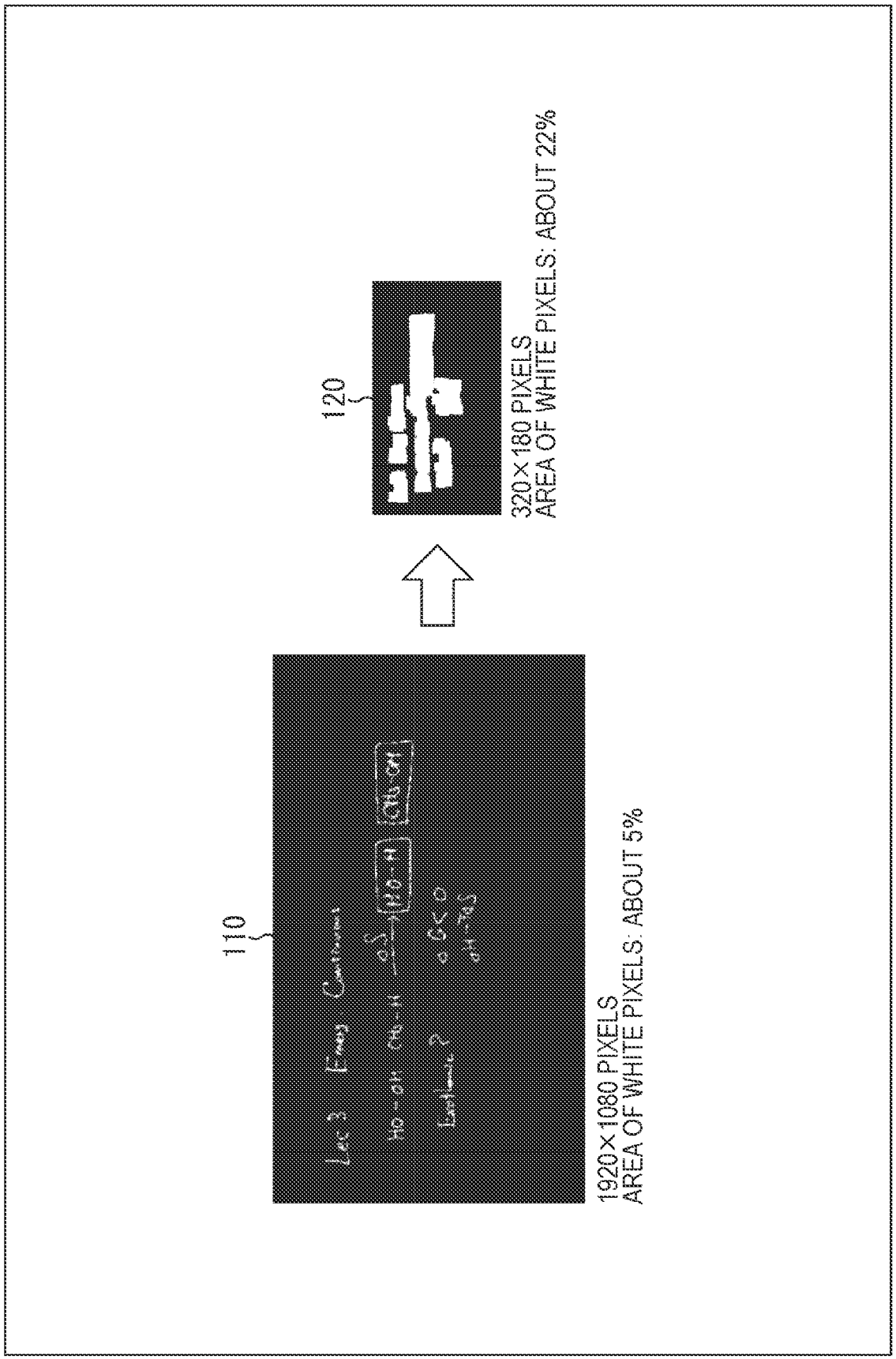
FIG. 8 is a diagram illustrating settings of a board writing region.

For example, it is assumed that a board writing image 110 illustrated on the left side of FIG. 8 has been extracted by the board writing image extraction unit 52. The board writing image 110 is a binarized image having a resolution of 1920×1080 pixels and an area of white pixels that occupies about 5% of the entire board writing image 110.

In a case where at least one white pixel exists in the vicinity of a pixel of interest in the board writing image 110 as described above, the pixel of interest is replaced with a white pixel by expansion processing. Moreover, the board writing image 110 that has been subjected to expansion processing is subjected to resolution reduction processing.

With this arrangement, the board writing image 110 illustrated on the left side of FIG. 8 is converted into a board writing image 120 illustrated on the right side of FIG. 8. The board writing image 120 is a binarized image having a resolution of 320×180 pixels and an area of white pixels that occupies about 22% of the entire board writing image 120.

A board writing image in which a board writing region has been set as in the board writing image 120 is hereinafter also referred to as a board writing region image.

In the board writing region image, a white pixel region is the board writing region that indicates the proportion of the range where the written information 3 is written to the writing object 2. The size of the board writing region is an index that shows how much of the writing object 2 is used for writing.

Specifically, in the example of FIG. 8, the board writing image 110 has the area of white pixels that occupies about 5% of the entire board writing image 110, whereas the board writing image 120 has the area of white pixels that occupies about 22% of the entire board writing image 120.

In a case where recording of the board writing image is simply controlled in response to a change in the written information, whether or not the board writing image is to be recorded is determined on the basis of the magnitude of increase or decrease of lines and dots written with a chalk or a marker.

However, even in a case where the written information occupies the same area in the board writing image, there is a possibility that whether or not the board writing image is to be recorded varies depending on the density of a plurality of written characters or the density of lines in a character itself, and may deviate from human sense. For example, in a case where the density of written characters is low, there is a possibility that the board writing image is not recorded even though those characters have been erased.

Thus, by controlling recording in response to a change in the board writing region set in the board writing image, it is possible to determine whether or not the board writing image is to be recorded in a state closer to the human sense.

Note that, instead of expansion processing on the written information in the board writing image for setting the board writing region, character recognition may be performed in the board writing image, and a character region in which the character recognition has been performed may be set as the board writing region.

Now, returning to the description of the flowchart in FIG. 3, in step S14, the recording control unit 54 executes recording control processing in accordance with the board writing state mode.

First, the mode setting unit 61 of the recording control unit 54 sets a board writing state mode in response to a change in the board writing region. Specifically, if the board writing region has increased, the mode setting unit 61 sets the "writing on board" mode as the board writing state mode. On the other hand, if the board writing region has reduced, the mode setting unit 61 sets the "erasing from board" mode as the board writing state mode.

Then, the recording control unit 54 controls recording of the board writing image in the storage unit 55 on the basis of the board writing state mode that has been set. Specifically, in a case where the "writing on board" mode has been set, since the written information has been added in the board writing image, the recording control unit 54 updates a recording candidate image that is a candidate for a recorded image. On the other hand, in a case where the "erasing from board" mode has been set, since the written information has been erased from the board writing image, the recording control unit 54 records the recording candidate image at that time as a recorded image.

Figure 9:
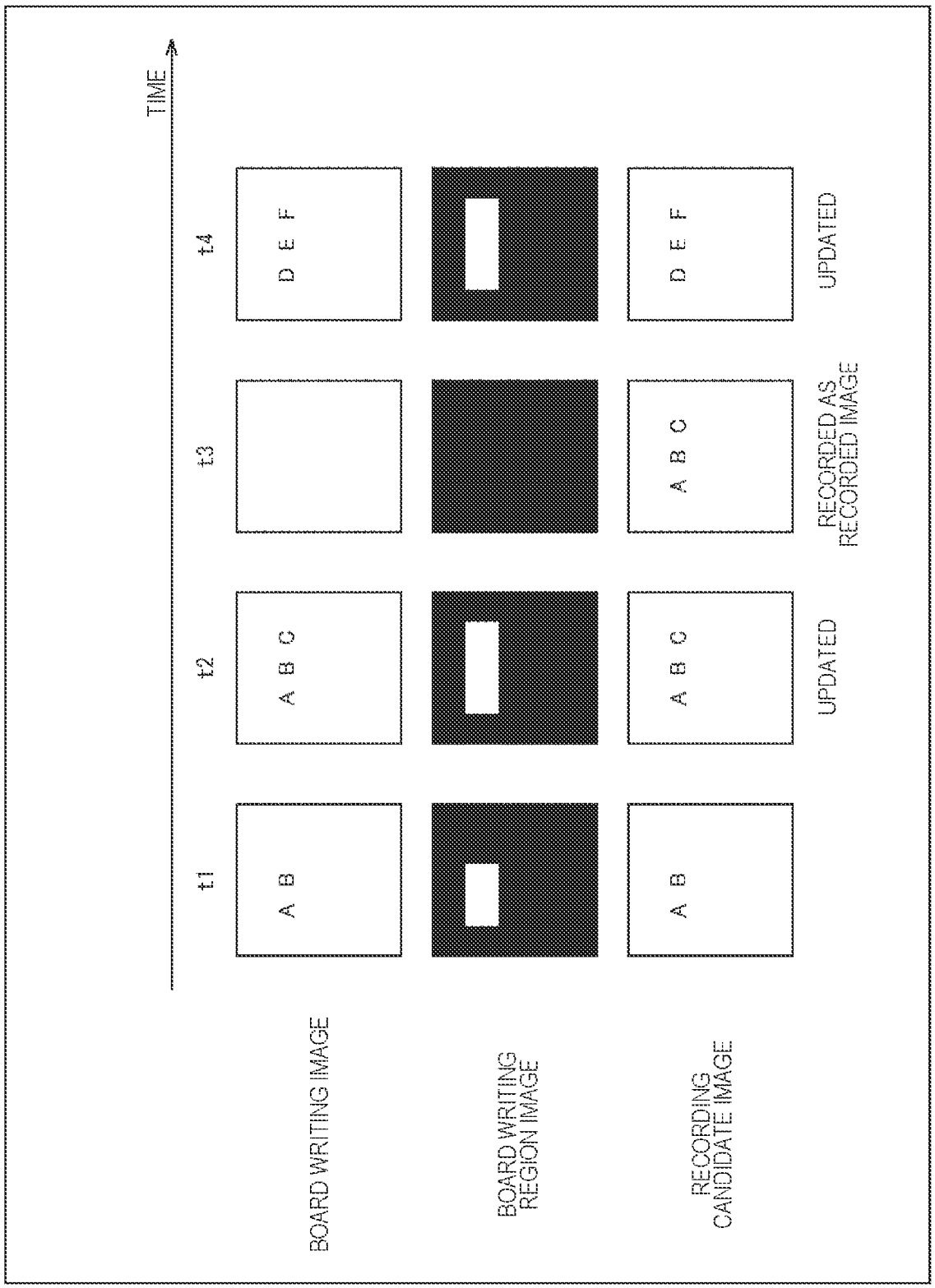
FIG. 9 is a diagram illustrating recording control in response to a change in a board writing region.

FIG. 9 is a diagram illustrating recording control in response to a change in the board writing region in the board writing image.

FIG. 9 illustrates a board writing image, a board writing region image, and a recording candidate image at each of times t1 to t4.

First, in the board writing image at time t1, "AB" is written as written information, and a board writing region image is obtained in which the range where "AB" is written has been set to white pixels. The recording candidate image at time t1 is a recording candidate image updated with the board writing image in which "AB" is written.

When "C" is written in addition to "AB" as the written information in the board writing image at time t2, a board writing region image is obtained in which the range where "ABC" is written has been set to white pixels. At this time, since the board writing region has increased, the "writing on board" mode is set, and the recording candidate image is updated with the board writing image in which "ABC" is written.

When "ABC" as the written information is completely erased from the board writing image at time t3, a board writing region image is obtained in which all the pixels have been set to black pixels. At this time, since the board writing region has reduced, the "erasing from board" mode is set, and the recording candidate image in which "ABC" is written is recorded as a recorded image.

Moreover, when "DEF" is written as the written information in the board writing image at time t4, a board writing region image is obtained in which the range where "DEF" is written has been set to white pixels. At this time, since the board writing region has increased, the "writing on board" mode is set, and the recording candidate image is updated with the board writing image in which "DEF" is written.

In this way, a board writing state mode is set in response to a change in the board writing region, and recording of the board writing image is controlled on the basis of the board writing state mode that has been set.

According to the above processing, recording of the board writing image is controlled in response to a change in the board writing region set in the board writing image, not in response to a change in the written information in the board writing image. With this arrangement, whether or not the board writing image is to be recorded is determined in a state closer to the human sense, not depending on the density of the written characters, and this makes it possible to appropriately record the information written on the writing object.

3-1. Details of Recording Control in Accordance with Mode

Figure 10:
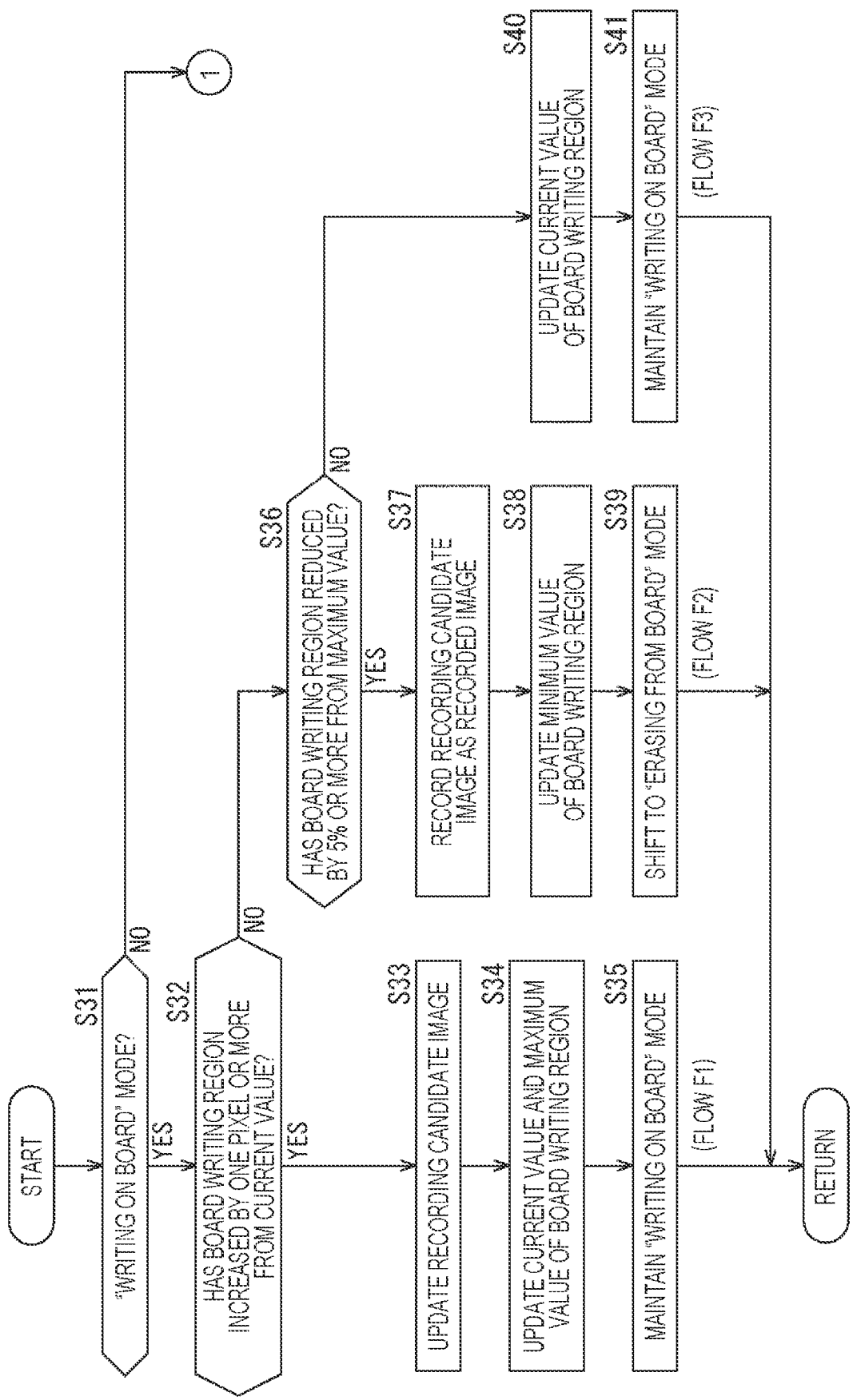
FIG. 10 is a flowchart illustrating details of recording control processing.
Figure 11:
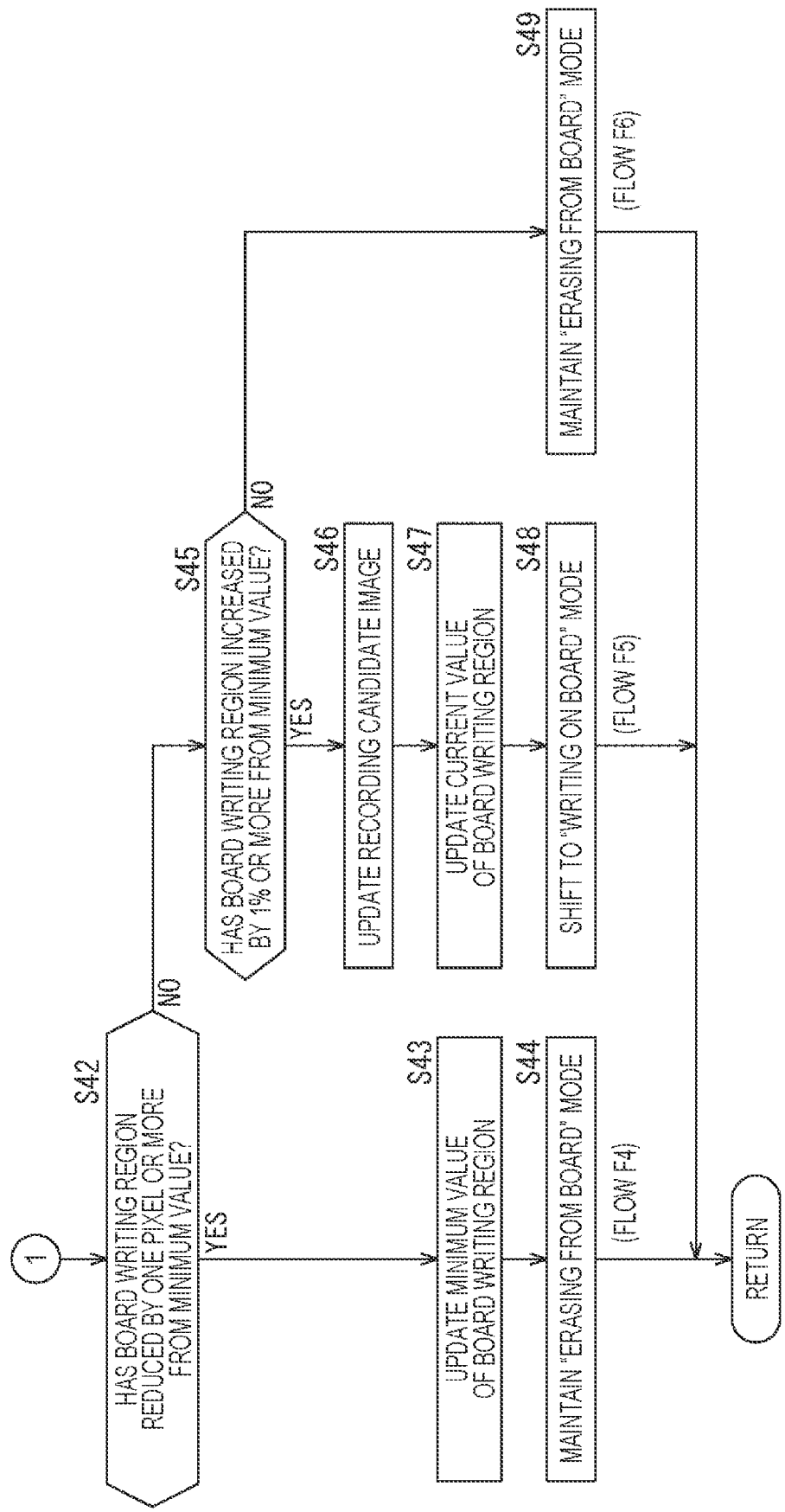
FIG. 11 is a flowchart illustrating the details of the recording control processing.

Here, details of the recording control processing in accordance with the board writing state mode in step S14 of FIG. 3 will be described with reference to flowcharts in FIGS. 10 and 11. The processing in FIGS. 10 and 11 is also performed on the board writing image for each frame.

In step S31, the recording control unit 54 determines whether or not the board writing state mode is the "writing on board" mode. As will be described later, the board writing state mode for the current frame is determined on the basis of the change in the board writing region in the previous frame. Note that the board writing state mode for the first frame is set to the "erasing from board" mode.

If it is determined that the board writing state mode is the "writing on board" mode, the processing proceeds to step S32.

In step S32, the recording control unit 54 determines whether or not the board writing region has increased by one pixel or more from a current value. The size of the board writing region is assumed to be stored in pixel units. The current value of the board writing region is held in a predetermined storage area, and is appropriately updated for each frame of the board writing image.

If it is determined that the board writing region has increased by one pixel or more from the current value, that is, if the written information has been added on the writing object 2, the processing proceeds to step S33.

In step S33, the recording control unit 54 updates the recording candidate image with the board writing image at that time. The recording candidate image is held in the predetermined storage area, and when, for example, the board writing region increases, the recording candidate image is updated with the board writing image at that time.

When the recording candidate image has been updated, in step S34, the recording control unit 54 updates the current value and the maximum value of the board writing region with the number of pixels of the board writing region (the size of the board writing region) at that time. The maximum value of the board writing region is also held in the predetermined storage area, and is appropriately updated for each frame of the board writing image.

Then, in step S35, the recording control unit 54 maintains the "writing on board" mode as the board writing state mode, and the processing proceeds to board writing recording processing for the next frame.

Here, the processing flow of steps S31 to S35 is appropriately referred to as flow F1.

Now, if it is determined in step S32 that the board writing region has not increased by one pixel or more from the current value, the processing proceeds to step S36.

In step S36, the recording control unit 54 determines whether or not the board writing region has reduced by 5% or more from the maximum value.

If it is determined that the board writing region has reduced by 5% or more from the maximum value, that is, if a certain amount or more of the written information has been erased from the writing object 2, the processing proceeds to step S37.

In step S37, the recording control unit 54 records the recording candidate image at that time as a recorded image.

When the recorded image has been recorded, in step S38, the recording control unit 54 updates the minimum value of the board writing region with the number of pixels of the board writing region (the size of the board writing region) at that time. The minimum value of the board writing region is also held in the predetermined storage area, and is appropriately updated for each frame of the board writing image.

Then, in step S39, the recording control unit 54 shifts the board writing state mode to the "erasing from board" mode, and the processing proceeds to board writing recording processing for the next frame.

Here, the processing flow of steps S31, S32, and S36 to S39 is appropriately referred to as flow F2.

Now, if it is determined in step S36 that the board writing region has not reduced by 5% or more from the maximum value, the processing proceeds to step S40.

In step S40, the recording control unit 54 updates the current value of the board writing region with the number of pixels of the board writing region (the size of the board writing region) at that time.

Then, in step S41, the recording control unit 54 maintains the "writing on board" mode as the board writing state mode, and the processing proceeds to board writing recording processing for the next frame.

Here, the processing flow of steps S31, S32, S36, S40, and S41 is appropriately referred to as flow F3.

Incidentally, if it is determined in step S31 that the board writing state mode is not the "writing on board" mode, that is, if the board writing state mode is the "erasing from board" mode, the processing proceeds to step S42 in FIG. 11.

In step S42, the recording control unit 54 determines whether or not the board writing region has reduced by one pixel or more from the minimum value.

If it is determined that the board writing region has reduced by one pixel or more from the minimum value, that is, if the written information has been erased from the writing object 2, the processing proceeds to step S43.

In step S43, the recording control unit 54 updates the minimum value of the board writing region with the number of pixels of the board writing region (the size of the board writing region) at that time.

Then, in step S44, the recording control unit 54 maintains the "erasing from board" mode as the board writing state mode, and the processing proceeds to board writing recording processing for the next frame.

Here, the processing flow of steps S31 and S42 to S44 is appropriately referred to as flow F4.

Now, if it is determined in step S42 that the board writing region has not reduced by one pixel or more from the minimum value, the processing proceeds to step S45.

In step S45, the recording control unit 54 determines whether or not the board writing region has increased by 1% or more from the minimum value.

If it is determined that the board writing region has increased by 1% or more from the minimum value, that is, if a certain amount or more of the written information has been added on the writing object 2, the processing proceeds to step S46.

In step S46, the recording control unit 54 updates the recording candidate image with the board writing image at that time.

When the recording candidate image has been updated, in step S47, the recording control unit 54 updates the current value of the board writing region with the number of pixels of the board writing region (the size of the board writing region) at that time.

Then, in step S48, the recording control unit 54 shifts the board writing state mode to the "writing on board" mode, and the processing proceeds to board writing recording processing for the next frame.

Here, the processing flow of steps S31, S42, and S45 to S48 is appropriately referred to as flow F5.

Now, if it is determined in step S45 that the board writing region has not increased by 1% or more from the minimum value, the processing proceeds to step S49.

In step S49, the recording control unit 54 maintains the "erasing from board" mode as the board writing state mode, and the processing proceeds to board writing recording processing for the next frame.

As described above, recording of the board writing image is controlled in accordance with the board writing state mode.

3-2. Example of Mode Transition

Figure 12:
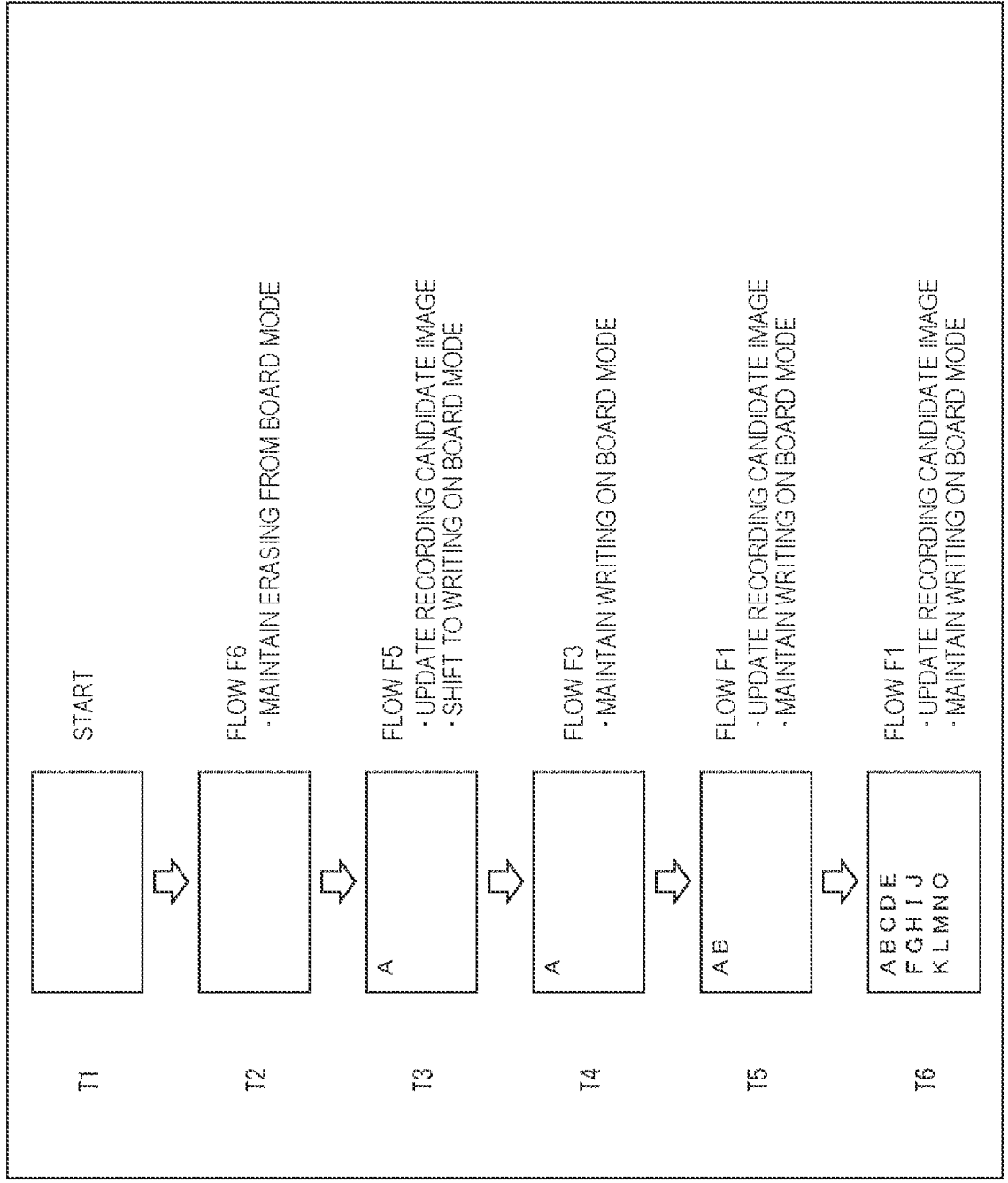
FIG. 12 is a diagram illustrating an example of mode transition.

FIG. 12 is a diagram illustrating an example of mode transition of the board writing state mode in the recording control processing described with reference to the flowcharts in FIGS. 10 and 11.

FIG. 12 illustrates a change in the written information in the board writing image at each of times T1 to T6.

In the example of FIG. 12, the board writing recording processing starts at time T1. The board writing state mode at this time is set to the "erasing from board" mode.

At time T2, there is no written information written in the board writing image, and the processing of flow F6 in the recording control processing described above is executed. As a result, the "erasing from board" mode is maintained.

At time T3, when "A" is written in the board writing image, the processing of flow F5 in the recording control processing described above is executed. As a result, the recording candidate image is updated with the board writing image in which "A" is written, and the mode is shifted to the "writing on board" mode.

At time 14, there is no written information that has been added from the state at time T3, and the processing of flow F3 in the recording control processing described above is executed. As a result, the "writing on board" mode is maintained.

At time T5, when "B" is added to the right of "A" from the state at time 14, the processing of flow F1 in the recording control processing described above is executed. As a result, the recording candidate image is updated with the board writing image in which "AB" is written, and the "writing on board" mode is maintained.

At time T6, when "CDE" is added to the right of "AB", and "FGHIJ" and "KLMNO" are added below "AB" and "CDE" from the state at time T5, the processing of flow F1 in the recording control processing described above is executed. As a result, the recording candidate image is updated with the board writing image in which "ABCDE", "FGHIJ", and "KLMNO" are written, and the "writing on board" mode is maintained.

Figure 13:
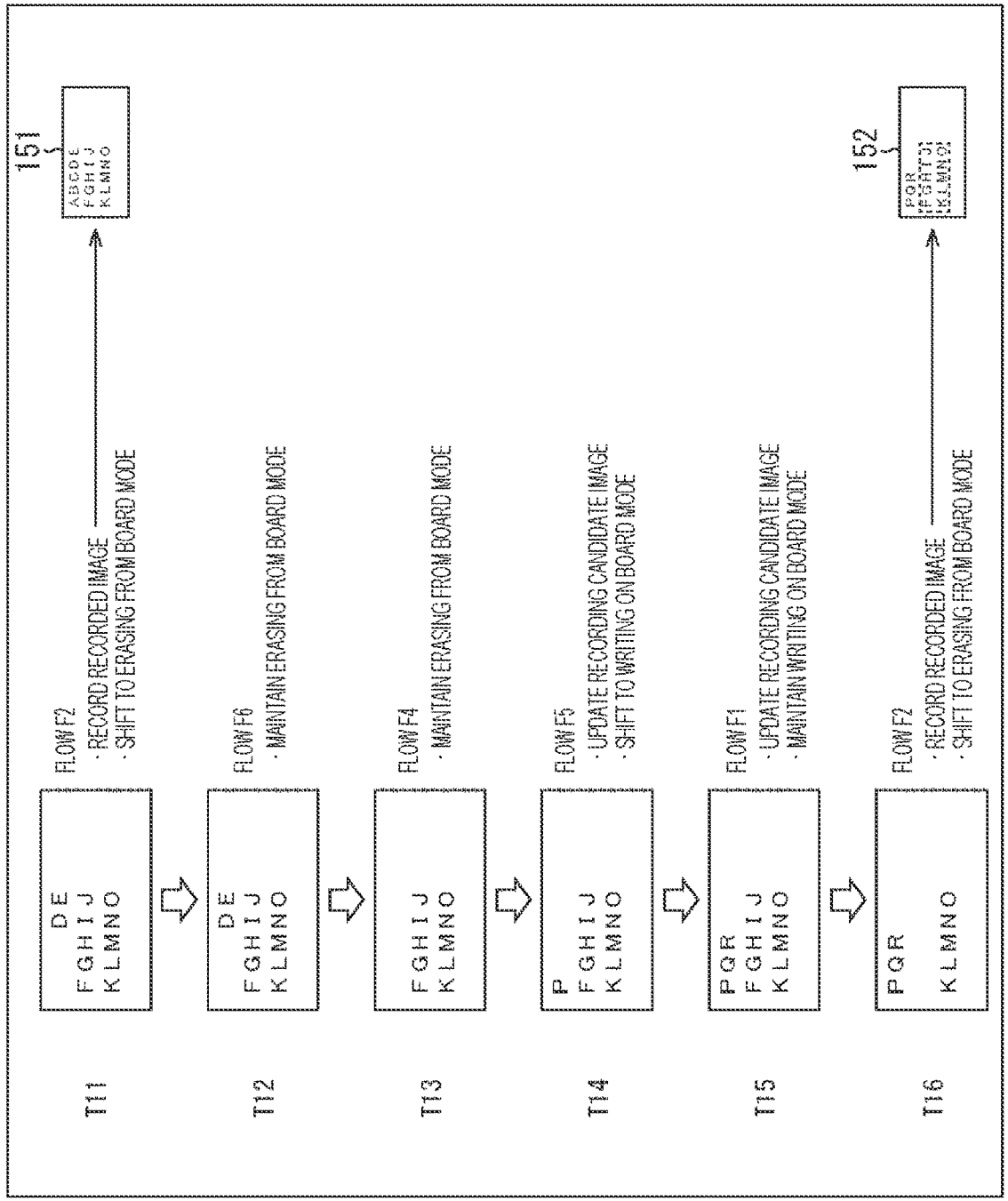
FIG. 13 is a diagram illustrating an example of the mode transition.

FIG. 13 is a diagram illustrating an example of mode transition after time T6 in FIG. 12.

FIG. 13 illustrates a change in the written information in the board writing image at each of times T11 to T16.

At time T11, when "ABC" is erased from the state at time T6 in FIG. 12, the processing of flow F2 in the recording control processing described above is executed. As a result, the recording candidate image in which "ABCDE", "FGHIJ", and "KLMNO" are written is recorded as a recorded image 151, and the mode is shifted to the "erasing from board" mode.

At time T12, the written information has not been further erased from the state at time T11, and the processing of flow F6 in the recording control processing described above is executed. As a result, the "erasing from board" mode is maintained.

At time T13, when "DE" is further erased from the state at time T12, the processing of flow F4 in the recording control processing described above is executed. As a result, the "erasing from board" mode is maintained.

At time 114, when "P" is written in the place where "A" had been written before the erasure from the state at time T13, the processing of flow F5 in the recording control processing described above is executed. As a result, the recording candidate image is updated with the board writing image in which "P", "FGHIJ", and "KLMNO" are written, and the mode is shifted to the "writing on board" mode.

At time T15, when "QR" is added to the right of "P" from the state at time 114, the processing of flow F1 in the recording control processing described above is executed. As a result, the recording candidate image is updated with the board writing image in which "PQR", "FGHIJ", and "KLMNO" are written, and the "writing on board" mode is maintained.

Thereafter, at time T16, when "FGHIJ" is erased from the state at time T15, the processing of flow F2 in the recording control processing described above is executed. As a result, the recording candidate image in which "PQR" and "KLMNO" are written is recorded as a recorded image 152, and the mode is shifted to the "erasing from board" mode.

Here, when the recorded image 151 and the recorded image 152 recorded in the mode transition in FIG. 13 are compared, even though "FGHIJ" and "KLMNO" indicated by a dotted line frame in the recorded image 152 have once been recorded as the recorded image 151, "FGHIJ" and "KLMNO" are recorded again.

That is, in the configuration of the board writing recording system 1 described above, the recording candidate image, which includes the written information included in the recorded image that has been recorded, is recorded again as a recorded image, and this may result in unnecessary recording.

Thus, in the following, an example of preventing written information that has once been recorded from being recorded again as described above will be described.

4. Another Configuration Example of Board Writing Recording System

Figure 14:
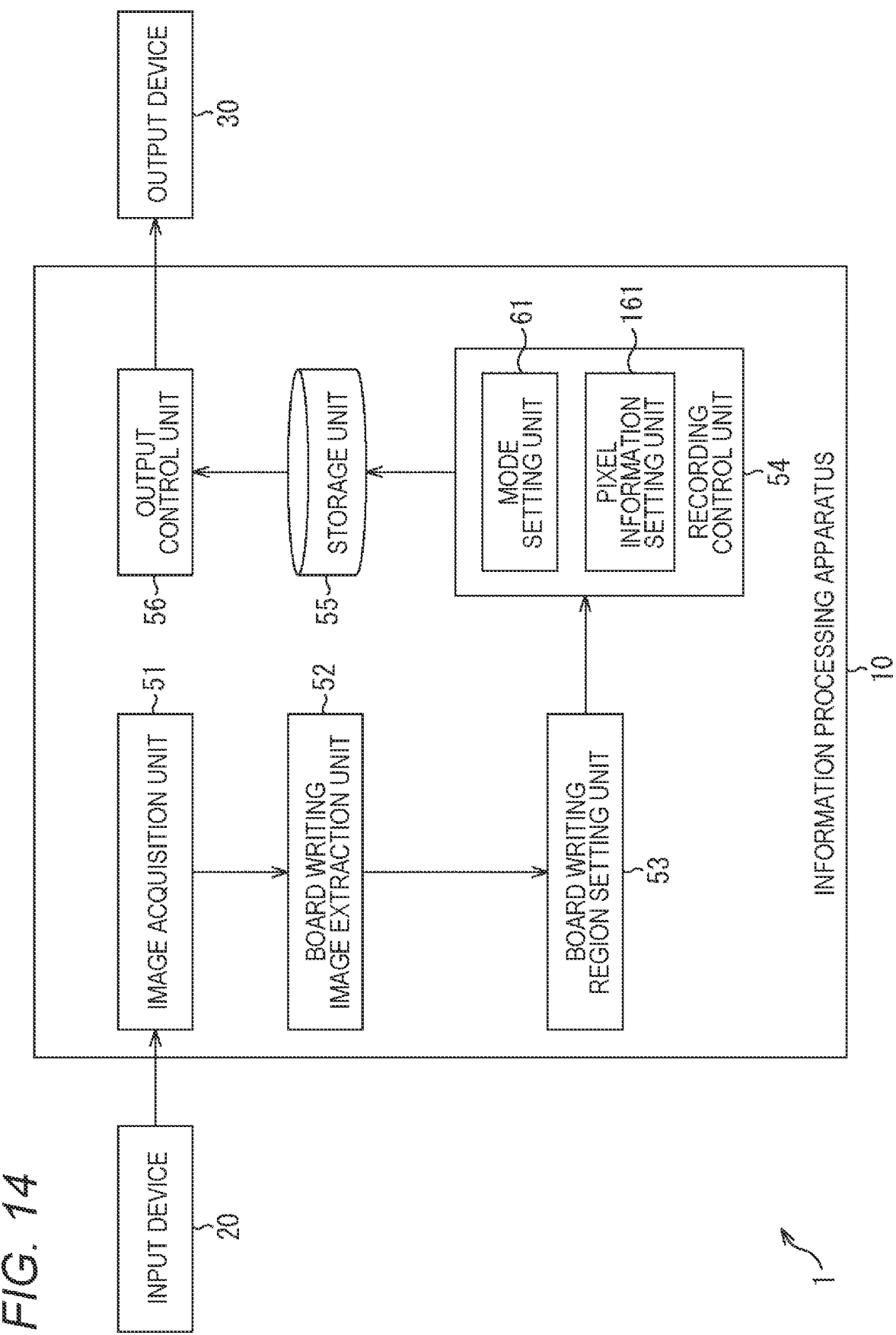
FIG. 14 is a block diagram illustrating another functional configuration example of an information processing apparatus.

FIG. 14 is a block diagram illustrating another functional configuration example of the board writing recording system 1.

The information processing apparatus 10 in FIG. 14 is different from the information processing apparatus 10 in FIG. 2 in that the recording control unit 54 further includes a pixel information setting unit 161.

The pixel information setting unit 161 sets pixel information that represents the state of each pixel in the board writing region in the board writing image (board writing region image).

For example, for pixels that form the board writing region corresponding to the written information that has not been erased (that has been left undeleted) since it was written in the board writing region image, the pixel information setting unit 161 sets, as pixel information, a board writing left undeleted time, which is the time elapsed since the written information was written.

Furthermore, for pixels that form the board writing region (hereinafter referred to as a recorded region) corresponding to the written information that has been recorded as a recorded image and has not been erased in the board writing region image, the pixel information setting unit 161 sets, as pixel information, a recorded flag instead of the board writing left undeleted time.

5. Flow of Board Writing Recording Processing

Next, a flow of board writing recording processing by the board writing recording system 1 in FIG. 14 will be described with reference to a flowchart in FIG. 15. The processing in FIG. 15 is also executed for each frame of the image input from the input device 20.

Figure 15:
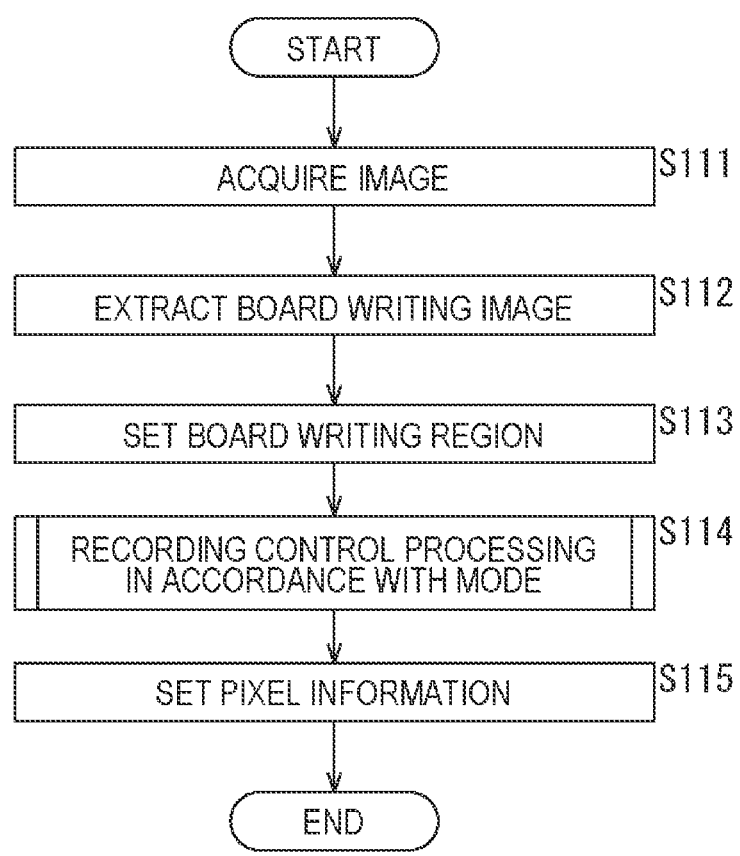
FIG. 15 is a flowchart illustrating the board writing recording processing.

Note that the processing of steps S111 to S114 in the flowchart in FIG. 15 is similar to the processing of steps S11 to S14 in the flowchart in FIG. 3, and the description thereof will be omitted.

That is, after the recording control processing in accordance with the mode has been executed in step S114, in step S115, the pixel information setting unit 161 sets pixel information (board writing left undeleted time) for each pixel of the board writing region in the board writing region image.

Figure 16:
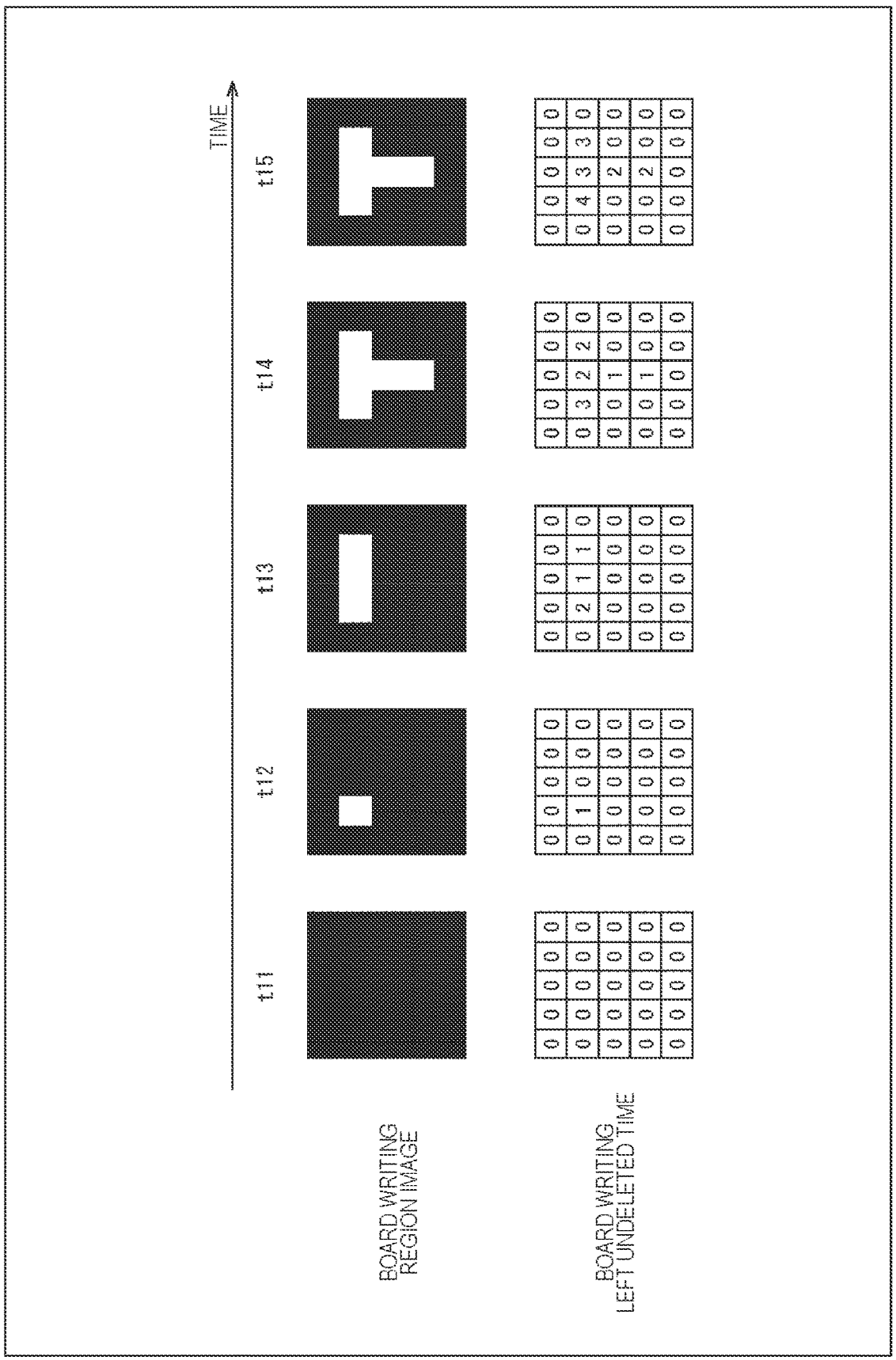
FIG. 16 is a diagram illustrating an example of setting a board writing left undeleted time.

FIG. 16 is a diagram illustrating an example of setting a board writing left undeleted time.

FIG. 16 illustrates a board writing region image at each of times t11 to t15 and a pixel information array in which board writing left undeleted times are set.

In a case where the board writing region image (board writing image) has a resolution of 320×180 pixels, a pixel information array of the same size (320×180 pixels) is prepared. A board writing left undeleted time is set as a value corresponding to each pixel of the pixel information array.

In the example of FIG. 16, for ease of explanation, a board writing region image and a pixel information array of 5×5 pixels are illustrated. In the following, for example, a pixel that is the second pixel from the top and the second pixel from the left is referred to as a pixel (2, 2).

In the board writing region image at time t11, there is no white pixel region, and all the values of the pixel information array are set to 0.

When the pixel (2, 2) is set to a white pixel in the board writing region image at time t12, in the pixel information array, the value corresponding to the pixel (2, 2) is set to 1 as the board writing left undeleted time.

When two pixels (2, 3) and (2, 4) are set to white pixels in the board writing region image at time t13, in the pixel information array, the values corresponding to the two pixels (2, 3) and (2, 4) are set to 1 as the board writing left undeleted times, and the value corresponding to the pixel (2, 2) is set to 2 as the board writing left undeleted time.

When two pixels (3, 3) and (4, 3) are set to white pixels in the board writing region image at time t14, in the pixel information array, the values corresponding to the two pixels (3, 3) and (4, 3) are set to 1 as the board writing left undeleted times, the values corresponding to the two pixels (2, 3) and (2, 4) are set to 2 as the board writing left undeleted times, and the value corresponding to the pixel (2, 2) is set to 3 as the board writing left undeleted time.

Then, at time t15, when none of the pixels have been set to a white pixel from the state at time t14, in the pixel information array, the values corresponding to the two pixels (3, 3) and (4, 3) are set to 2 as the board writing left undeleted times, the values corresponding to the two pixels (2, 3) and (2, 4) are set to 3 as the board writing left undeleted times, and the value corresponding to the pixel (2, 2) is set to 4 as the board writing left undeleted time.

As described above, the board writing left undeleted times in the board writing region (white pixels) are counted up with the passage of time.

5-1. Masking of Recorded Region

An example of masking a recorded region when a recording candidate image is updated in order to prevent written information that has once been recorded from being recorded again will be described with reference to FIG. 17.

Figure 17:
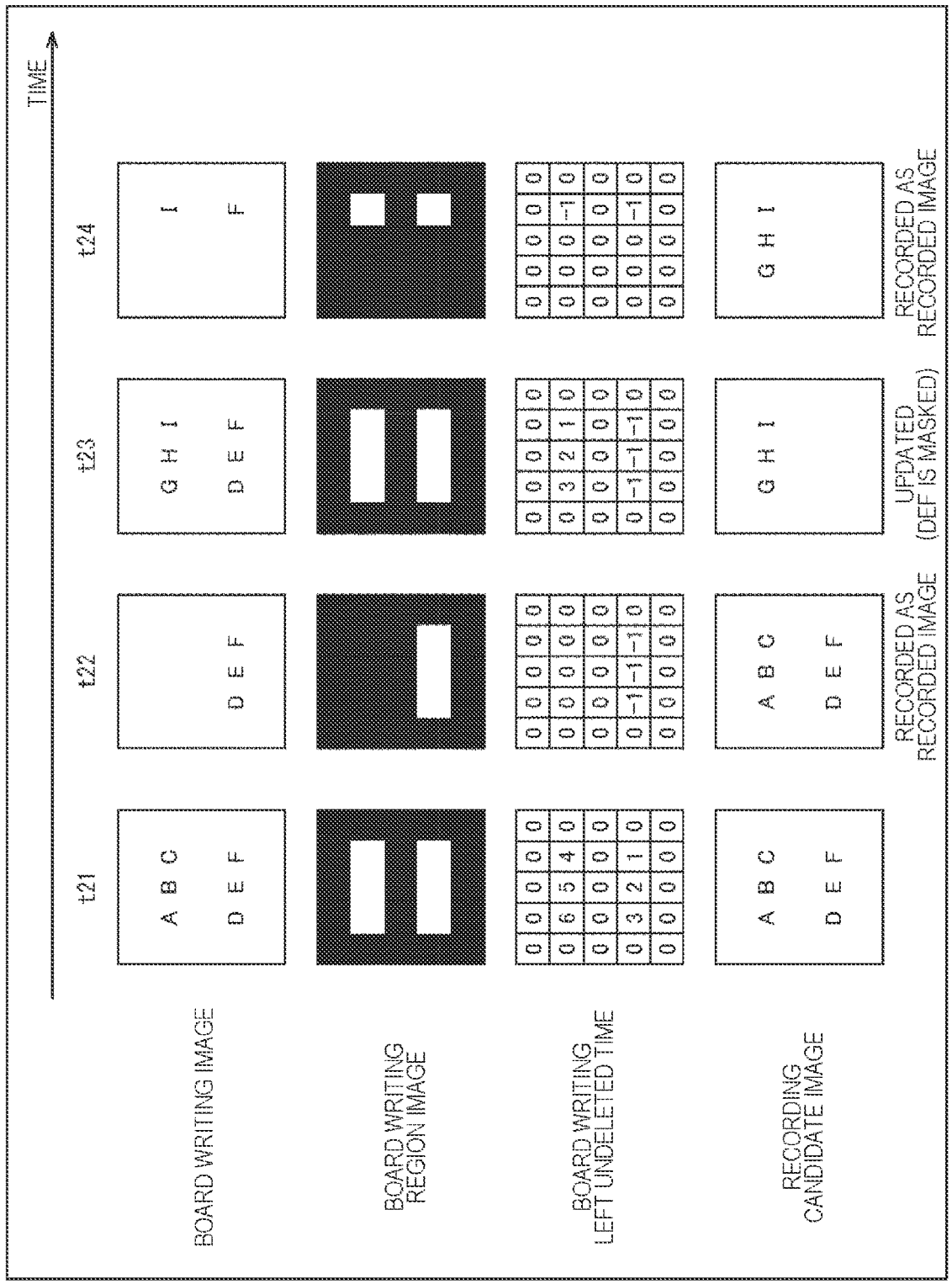
FIG. 17 is a diagram illustrating masking of a recorded region.

FIG. 17 illustrates a board writing image, a board writing region image, a pixel information array in which board writing left undeleted times are set, and a recording candidate image at each of times t21 to t24.

Also in the example of FIG. 17, a board writing region image and a pixel information array of 5×5 pixels are illustrated.

In the board writing image at time t21, "ABC" and "DEF" are written as written information, and in the board writing region image, pixels (2, 2), (2, 3), (2, 4), (4, 2), (4, 3), and (4, 4) are set to white pixels. At this time, the recording candidate image is updated with the board writing image in which "ABC" and "DEF" are written.

At this time, in the pixel information array, the values corresponding to the three pixels (2, 2), (2, 3), and (2, 4) are respectively set to 6, 5, and 4 as the board writing left undeleted times, and the values corresponding to the three pixels (4, 2), (4, 3), and (4, 4) are respectively set to 3, 2, and 1 as the board writing left undeleted times. That is, in the board writing image, "A" has been written least recently, and "F" has been written most recently.

When "ABC" is erased from the state at time t21 in the board writing image at time t22, the pixels (2, 2), (2, 3), and (2, 4) are set to black pixels in the board writing region image, and the recording candidate image in which "ABC" and "DEF" are written is recorded as a recorded image.

At this time, in the pixel information array, each of the values corresponding to the three pixels (2, 2), (2, 3), and (2, 4) is set to 0 as the board writing left undeleted time, and each of the values corresponding to the three pixels (4, 2), (4, 3), and (4, 4) where the written information is left undeleted is set to −1 as the board writing left undeleted time. That is, the recorded flag is set for the three pixels (4, 2), (4, 3), and (4, 4) that form a recorded region.

In the board writing image at time t23, when "GHI" is written in the place where "ABC" had been written before the erasure from the state at time t22, in the board writing region image, the pixels (2, 2), (2, 3), and (2, 4) are set to white pixels again. At this time, in the pixel information array, masking is applied to the pixels in the recorded region (the region where "DEF" is written in the board writing image) for which −1, which is the recorded flag, is set, so that the recording candidate image in which only "GHI" is written is recorded as a recorded image.

At this time, in the pixel information array, the values corresponding to the three pixels (2, 2), (2, 3), and (2, 4) are respectively set to 3, 2, and 1 as the board writing left undeleted times.

When "GH" and "DE" are erased from the state at time t23 in the board writing image at time t24, in the board writing region image, the pixels (2, 2), (2, 3), (4, 2), and (4, 3) are set to black pixels, and the recording candidate image in which only "GHI" is written is recorded as a recorded image.

At this time, in the pixel information array, each of the values corresponding to the four pixels (2, 2), (2, 3), (4, 2), and (4, 3) is set to 0 as the board writing left undeleted time, and the value corresponding to one pixel (2, 4) in which the written information is left undeleted is set to −1 as the board writing left undeleted time. That is, the recorded flag is set for the two pixels (2, 4) and (4, 4) that form recorded regions.

Next, details of the above-described recording control processing that implements the masking of the recorded regions will be described with reference to a flowchart in FIG. 18.

Figure 18:
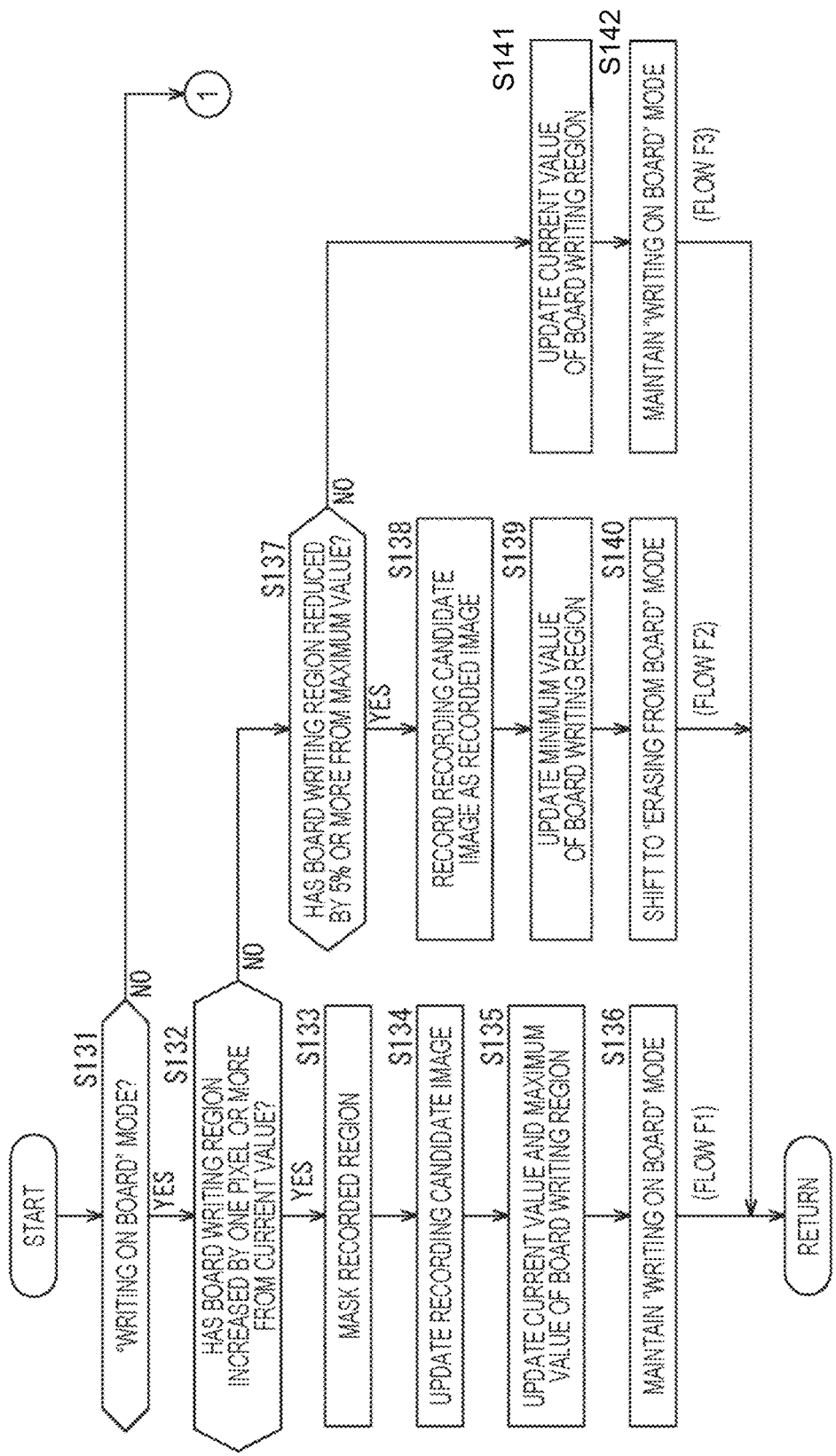
FIG. 18 is a flowchart illustrating the details of the recording control processing.

The processing flow in steps S131 to S143 in FIG. 18 is basically similar to the processing flow in steps S31 to S41 in FIG. 10 (flows F1, F2, and F3), but is different in that the processing of step S133 is added.

Specifically, in step S132 in the "writing on board" mode, if it is determined that the board writing region has increased by one pixel or more from the current value, for example, if written information has been added after recording of the recorded image, as in time t23 in FIG. 17, the processing proceeds to step S133.

In step S133, the recording control unit 54 masks a recorded region in the board writing image. The recorded region corresponds to a pixel in which −1, which is the recorded flag, is set in step S115 of the board writing recording processing (FIG. 15) one frame before. With this arrangement, in step S134, the recording candidate image is updated with the board writing image in which the recorded region (the pixel for which the recorded flag is set) is masked.

Figure 19:
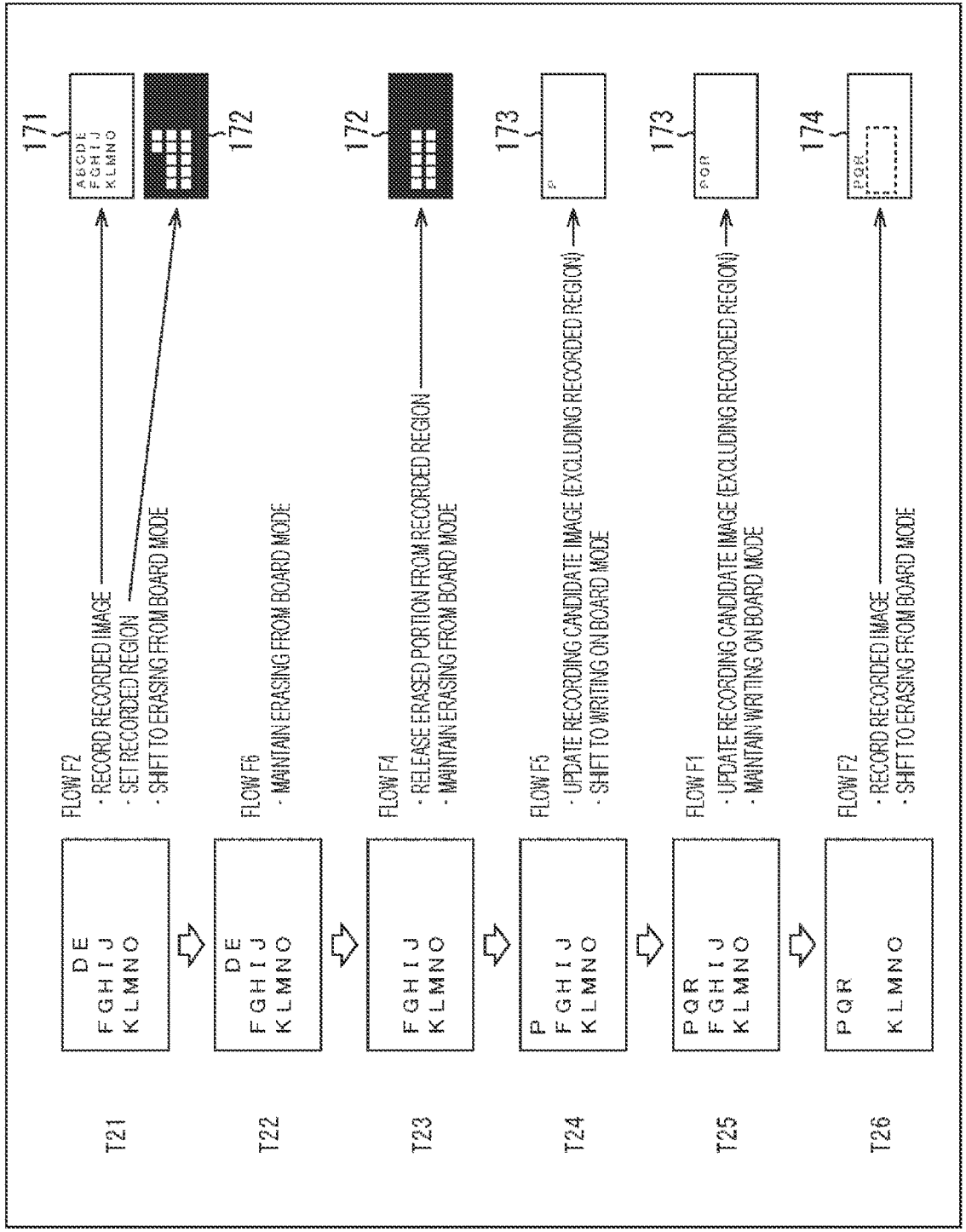
FIG. 19 is a diagram illustrating an example of the mode transition.

FIG. 19 is a diagram illustrating an example of the mode transition of the board writing state mode in the recording control processing described with reference to the flowchart in FIG. 18, and is a diagram illustrating an example of the mode transition after time T6 in FIG. 12.

FIG. 19 illustrates a change in the written information in the board writing image at each of times T21 to T26.

At time T21, when "ABC" is erased from the state at time T6 in FIG. 12, the processing of flow F2 in the recording control processing described above is executed. As a result, the recording candidate image in which "ABCDE", "FGHIJ", and "KLMNO" is written is recorded as a recorded image 171, and white pixel regions in a board writing region image 172 corresponding to "DE", "FGHIJ", "KLMNO" that are left undeleted are set as recorded regions, and the mode is shifted to the "erasing from board" mode.

At time T22, the written information has not been further erased from the state at time T21, and the processing of flow F6 in the recording control processing described above is executed. As a result, the "erasing from board" mode is maintained.

At time T23, when "DE" is further erased from the state at time T22, the processing of flow F4 in the recording control processing described above is executed. As a result, in the board writing region image 172, the white pixel region corresponding to the erased "DE" is released from the recorded region, and the "erasing from board" mode is maintained.

At time 124, when "P" is written in the place where "A" had been written before the erasure from the state at time T23, the processing of flow F5 in the recording control processing described above is executed. As a result, the pixels of the recorded regions corresponding to "FGHIJ" and "KLMNO" are masked, a recording candidate image 173 is updated with the board writing image in which only "P" is written, and the mode is shifted to the "writing on board" mode.

At time T25, when "QR" is added to the right of "P" from the state at time 124, the processing of flow F1 in the recording control processing described above is executed. As a result, the recording candidate image 173 is updated with the board writing image in which only "PQR" is written, in which the pixels of the recorded regions corresponding to "FGHIJ" and "KLMNO" are masked, and the "writing on board" mode is maintained.

Thereafter, at time T26, when "FGHIJ" is erased from the state at time T25, the processing of flow F2 in the recording control processing described above is executed. As a result, the recording candidate image in which only "PQR" is written is recorded as a recorded image 174, and the mode is shifted to the "erasing from board" mode.

Here, when the recorded image 171 and the recorded image 174 recorded in the mode transition in FIG. 19 are compared, in the recorded image 174, "FGHIJ" and "KLMNO" that have once been recorded as the recorded image 171 are not recorded as indicated by a dotted frame. As a result, the recording candidate image excluding the writing region included in the recorded image that has been recorded is recorded as a recorded image.

That is, according to the above processing, the recording candidate image including the written information included in the recorded image that has been recorded is not recorded again as the recorded image, and this makes it possible to prevent unnecessary recording.

In the above example, a value −1 is set as a recorded flag set for a pixel that forms a recorded region. Alternatively, it is also possible to allow any value to be set as long as the value can be distinguished from the board writing left undeleted time.

Incidentally, in the above-described processing, when a certain amount or more of the written information is erased in the "writing on board" mode (specifically, when the board writing region has reduced by 5% or more from the maximum value), the recording candidate image at that time is recorded as a recorded image.

Therefore, in a case where the writing person 4 erases a certain amount or more of the written information for correcting an error in writing or the like while writing the written information 3, a board writing image that contains the error in writing is recorded, and this results in unnecessary recording.

Thus, in the following, an example of preventing a board writing image that contains an error in writing from being recorded as described above will be described.

5-2. Recording Control in Accordance with Board Writing Left Undeleted Time

Figure 20:
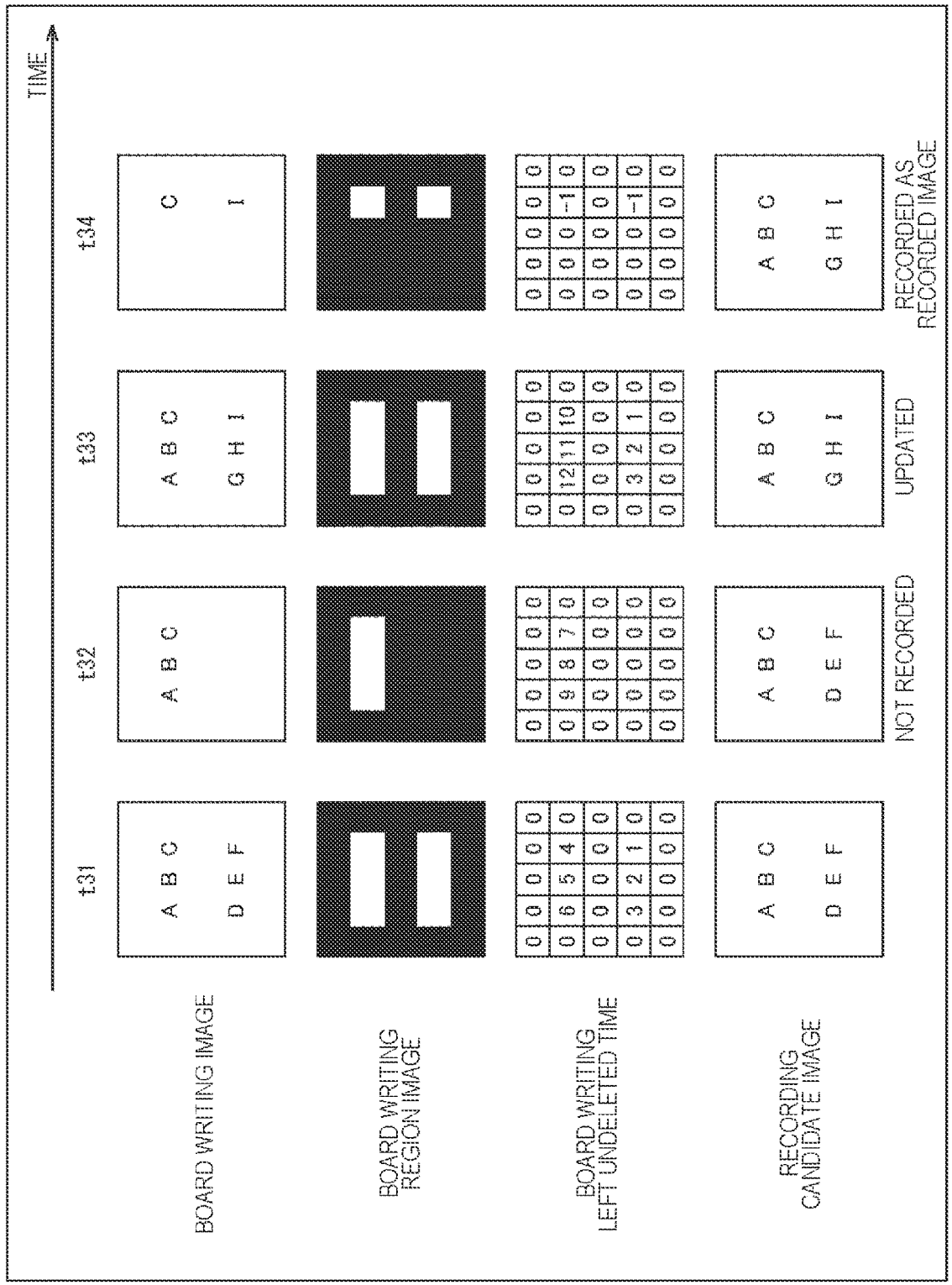
FIG. 20 is a diagram illustrating a record in accordance with a board writing left undeleted time.

FIG. 20 is a diagram illustrating an example in which recording control is performed in accordance with the board writing left undeleted time in order to prevent a board writing image that contains an error in writing from being recorded.

FIG. 20 illustrates a board writing image, a board writing region image, a pixel information array in which board writing left undeleted times are set, and a recording candidate image at each of times t31 to t34.

Also in the example of FIG. 20, a board writing region image and a pixel information array of 5×5 pixels are illustrated.

In the board writing image at time t31, "ABC" and "DEF" are written as written information, and in the board writing region image, the pixels (2, 2), (2, 3), (2, 4), (4, 2), (4, 3), and (4, 4) are set to white pixels. At this time, the recording candidate image is updated with the board writing image in which "ABC" and "DEF" are written.

At this time, in the pixel information array, the values corresponding to the three pixels (2, 2), (2, 3), and (2, 4) are respectively set to 6, 5, and 4 as the board writing left undeleted times, and the values corresponding to the three pixels (4, 2), (4, 3), and (4, 4) are respectively set to 3, 2, and 1 as the board writing left undeleted times. That is, in the board writing image, "A" has been written least recently, and "F" has been written most recently.

When "DEF" is erased from the state at time t31 in the board writing image at time t32, the pixels (4, 2), (4, 3), and (4, 4) are set to black pixels in the board writing region image, and, although the board writing region reduces, the recording candidate image in which "ABC" and "DEF" are written is not recorded as a recorded image.

At this time, in the pixel information array, the values corresponding to the three pixels (2, 2), (2, 3), and (2, 4) are respectively set to 9, 8, and 7 as the board writing left undeleted times in accordance with the elapsed time since "ABC" was written, and each of the values corresponding to the three pixels (4, 2), (4, 3), and (4, 4) where "DEF" has been erased is set to 0 as the board writing left undeleted time.

In the board writing image at time t33, when "GHI" is written in the place where "DEF" had been written before the erasure from the state at time t32, in the board writing region image, the pixels (4, 2), (4, 3), and (4, 4) are set to white pixels again. The recording candidate image is updated with the board writing image in which "ABC" and "GHI" are written.

At this time, in the pixel information array, the values corresponding to the three pixels (2, 2), (2, 3), and (2, 4) are respectively set to 12, 11, and 10 as the board writing left undeleted times, and the values corresponding to the three pixels (4, 2), (4, 3), and (4, 4) are respectively set to 3, 2, and 1 as the board writing left undeleted times.

When "AB" and "GH" are erased from the state at time t33 in the board writing image at time t34, the pixels (2, 2), (2, 3), (4, 2), and (4, 3) are set to black pixels in the board writing region image, and the recording candidate image in which "ABC" and "GHI" are written is recorded as a recorded image.

At this time, in the pixel information array, each of the values corresponding to the four pixels (2, 2), (2, 3), (4, 2), and (4, 3) is set to 0 as the board writing left undeleted time, and the values corresponding to the two pixels (2, 4) and (4, 4) in which the written information is left undeleted are set to −1 as the board writing left undeleted times. That is, the recorded flag is set for the two pixels (2, 4) and (4, 4) that form recorded regions.

Next, details of the above-described recording control processing that implements the recording control in accordance with the board writing left undeleted time will be described with reference to a flowchart in FIG. 21.

Figure 21:
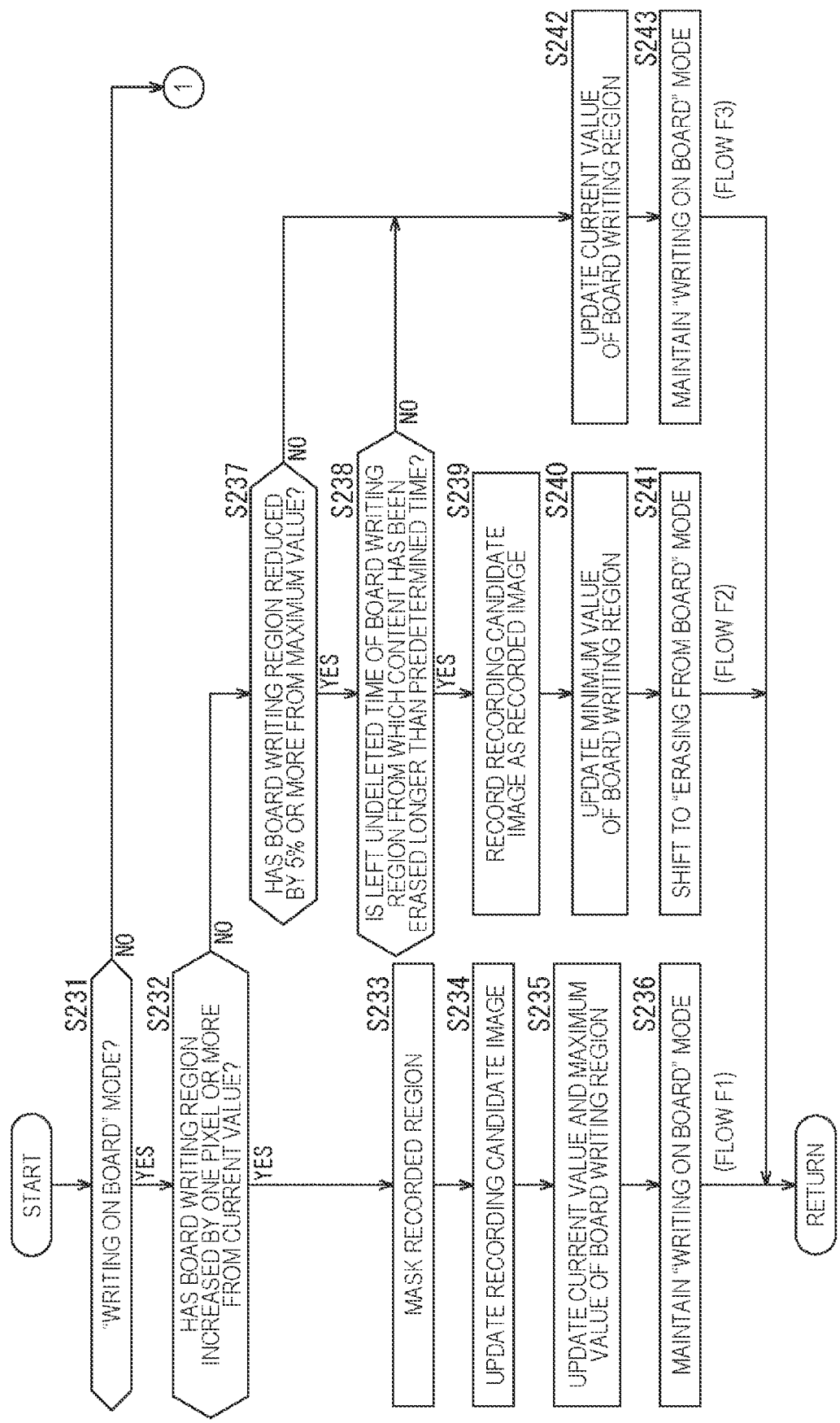
FIG. 21 is a flowchart illustrating the details of the recording control processing.

The processing flow in steps S231 to S243 in FIG. 21 is basically similar to the processing flow in steps S131 to S142 in FIG. 18 (flows F1, F2, and F3), but is different in that the processing of step S238 is added.

Specifically, in step S237 in the "writing on board" mode, if it is determined that the board writing region has reduced by 5% or more from the maximum value, the processing proceeds to step S238.

In step S238, the recording control unit 54 determines whether or not the board writing left undeleted time of the board writing region from which content has been erased is longer than a predetermined time. Here, for example, it is determined whether or not the board writing left undeleted time of the board writing region from which content has been erased is longer than six unit times.

If it is determined that the board writing left undeleted time of the board writing region from which content has been erased is longer than the predetermined time, the processing proceeds to step S239, and the processing of flow F2 is executed thereafter. That is, the recording candidate image at that time is recorded as a recorded image, and the mode is shifted to the "erasing from board" mode.

On the other hand, in step S238, if it is determined that the board writing left undeleted time of the board writing region from which content has been erased is not longer (is shorter) than the predetermined time, that is, if the board writing left undeleted time of the board writing region from which content has been erased is equal to or less than six unit times as in time t32 in FIG. 20, the processing proceeds to step S242, and the processing of flow F3 is executed thereafter. That is, the recording candidate image at that time is not recorded as a recorded image.

Figure 22:
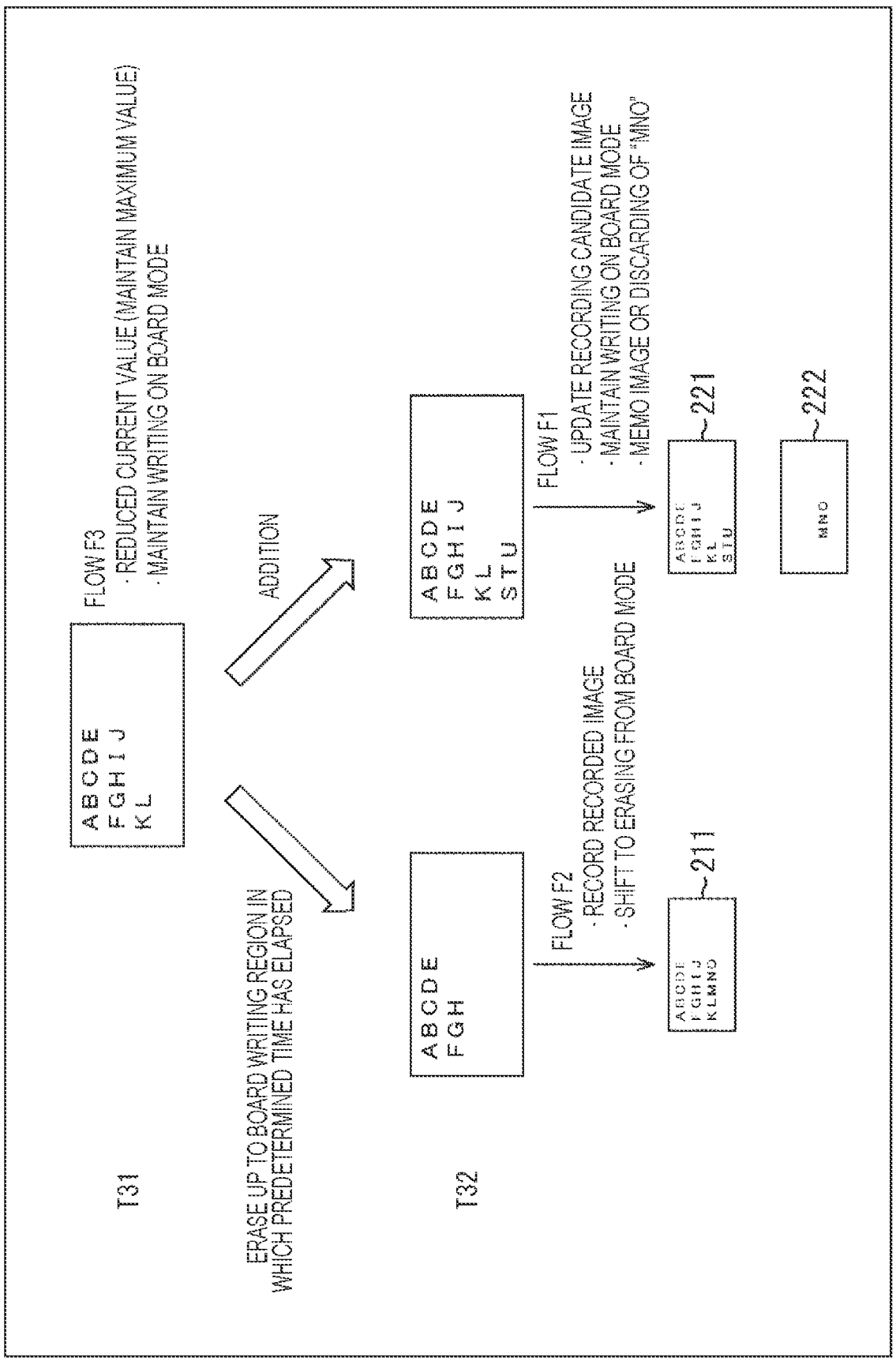
FIG. 22 is a diagram illustrating an example of the mode transition.

FIG. 22 is a diagram illustrating an example of the mode transition of the board writing state mode in the recording control processing described with reference to the flowchart in FIG. 21, and is a diagram illustrating an example of the mode transition after time T6 in FIG. 12.

FIG. 22 illustrates a change in the written information in the board writing image at each of times T31 and 32.

At time T31, when "MNO", in which the board writing left undeleted time is shorter than the predetermined time, is erased from the state at time T6 in FIG. 12, the processing of flow F3 in the recording control processing described above is executed. As a result, the current value of the board writing region reduces (the maximum value is maintained), and the "writing on board" mode is maintained.

At time T32, in a case where the board writing region after elapse of a predetermined time, that is, "KL" in which the board writing left undeleted time is longer than the predetermined time, is erased from the state at time T31, the processing of flow F2 in the recording control processing described above is executed. As a result, the recording candidate image in which "ABCDE", "FGHIJ", and "KLMNO" are written is recorded as a recorded image 211, and the mode is shifted to the "erasing from board" mode.

On the other hand, at time T32, in a case where "STU" is added below "KL" that is left undeleted from the state at time T31, the processing of flow F1 in the recording control processing described above is executed. As a result, a recording candidate image 221 is updated with the board writing image in which "ABCDE", "FGHIJ", "KL", and "STU" are written, and the "writing on board" mode is maintained.

At this time, the image in which "MNO" erased before the elapse of the predetermined time may be recorded as a memo image 222, or may be discarded without being recorded.

In this way, in the mode transition of FIG. 22, even in a case where a certain amount or more of the written information is erased in the "writing on board" mode, the recording candidate image is not updated with the board writing image that includes "MNO" that has been erased before the elapse of the predetermined time.

That is, according to the above processing, even in a case where the writing person 4 erases a certain amount or more of the written information for correcting an error in writing or the like while writing the written information 3, a board writing image that contains the error in writing is not recorded, and this makes it possible to prevent unnecessary recording.

6. Configuration Example of Computer

The series of processing described above can be executed not only by hardware but also by software. In a case where the series of processing is executed by software, a program constituting the software is installed from a program recording medium into a computer built into dedicated hardware, a general-purpose personal computer, or the like.

Figure 23:
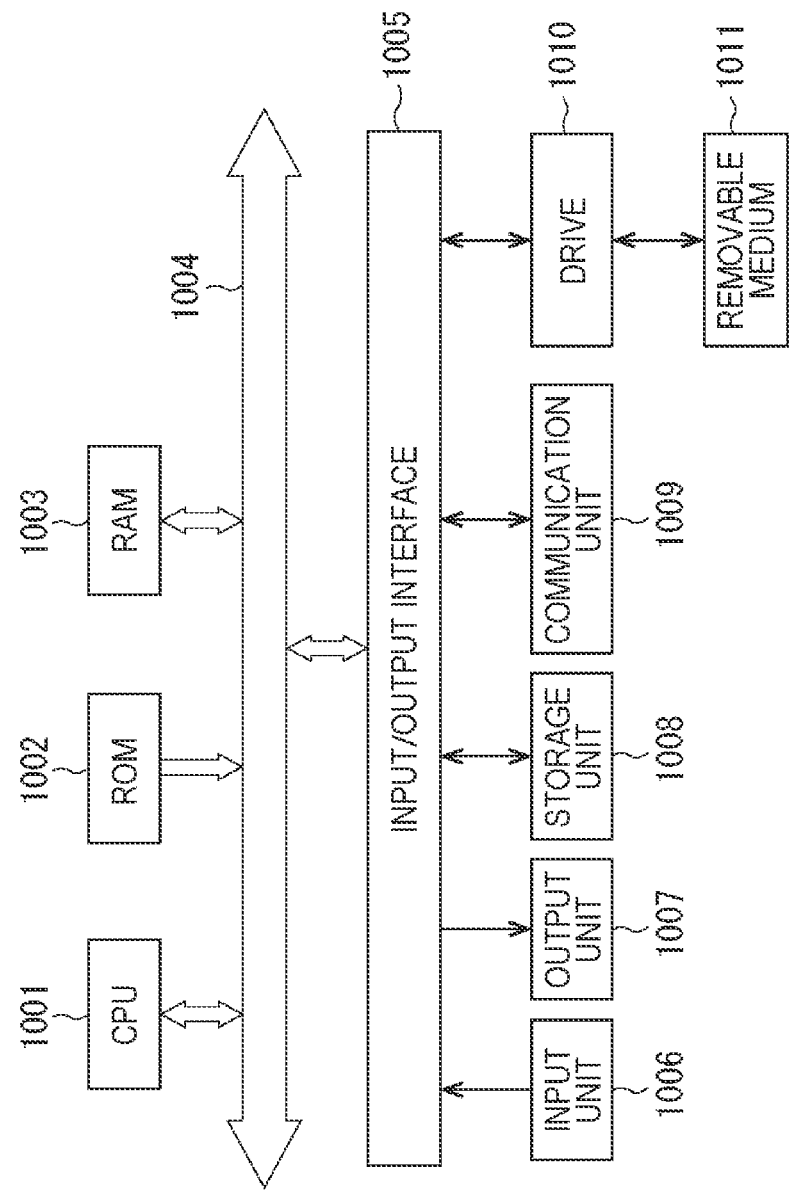
FIG. 23 is a block diagram illustrating a configuration example of hardware of a computer.

FIG. 23 is a block diagram illustrating a configuration example of hardware of a computer that executes the series of pieces of processing described above in accordance with a program.

The information processing apparatus 10 described above is achieved by a computer having the configuration illustrated in FIG. 23.

A central processing unit (CPU) 1001, a read only memory (ROM) 1002, and a random access memory (RAM) 1003 are connected to each other by a bus 1004.

The bus 1004 is further connected with an input/output interface 1005. The input/output interface 1005 is connected with an input unit 1006 constituted by a keyboard, a mouse, or the like, and an output unit 1007 constituted by a display, a speaker, or the like. Furthermore, the input/output interface 1005 is connected with a storage unit 1008 constituted by a hard disk, a non-volatile memory, or the like, a communication unit 1009 constituted by a network interface or the like, and a drive 1010 that drives a removable medium 1011.

To perform the series of processing described above, the computer configured as described above causes the CPU 1001 to, for example, load a program stored in the storage unit 1008 into the RAM 1003 via the input/output interface 1005 and the bus 1004 and then execute the program.

The program to be executed by the CPU 1001 is recorded on the removable medium 1011, or provided via a wired or wireless transmission medium such as a local area network, the Internet, or a digital broadcast, and installed on the storage unit 1008.

Note that the program to be executed by the computer may be a program that performs the pieces of processing in chronological order as described in the present specification, or may be a program that performs the pieces of processing in parallel or when needed, for example, when the processing is called.

Embodiments of the present disclosure are not limited to the embodiment described above, and can be modified in various ways within a scope of the present disclosure.

Furthermore, the effects described herein are merely illustrative and are not intended to be restrictive, and other effects may be obtained.

Moreover, the present disclosure may have the following configurations.

(1)

An information processing apparatus including:

a region setting unit that sets, in a writing image that shows a writing object on which written information is written, a writing region that includes the written information; and a recording control unit that controls recording of the writing image in response to a change in the writing region.

(2)

The information processing apparatus according to (1), in which the writing region indicates a proportion of a range where the written information is written to the writing object.

(3)

The information processing apparatus according to (1) or (2), in which the region setting unit sets the writing region by performing expansion processing on the written information in the writing image.

(4)

The information processing apparatus according to (3), in which the region setting unit further performs resolution reduction processing on the writing image in which the writing region has been set.

(5)

The information processing apparatus according to (1) or (2), in which the region setting unit sets, as the writing region, a character region in which character recognition has been performed in the writing image.

(6)

The information processing apparatus according to any one of (1) to (5), in which the recording control unit:

updates, with the writing image, a recording candidate image that is a candidate for a recorded image in response to an increase of the writing region; and records the recording candidate image as the recorded image in response to a reduction of the writing region.

(7)

The information processing apparatus according to (6), in which the recording control unit records, as the recorded image, the recording candidate image excluding the writing region included in the recorded image that has been recorded.

(8)

The information processing apparatus according to (7), in which when the writing region has increased from a state in which a part of the writing region is left undeleted after the recorded image has been recorded, the recording control unit updates the recording candidate image with the writing image in which the writing region that is left undeleted is masked.

(9)

The information processing apparatus according to (8), further including:

a setting unit that sets a recorded flag for a pixel of the writing region that is left undeleted in the writing image when the recorded image is recorded, in which when the writing region has increased, the recording control unit updates the recording candidate image with the writing image in which the pixel for which the recorded flag is set is masked.

(10)

The information processing apparatus according to (6), in which when the writing region has reduced, the recording control unit determines whether or not to record the recording candidate image as the recorded image on the basis of a left undeleted time of the writing region that has been erased.

(11)

The information processing apparatus according to (10), further including:

a setting unit that sets the left undeleted time of the writing region for each pixel of the writing image, in which the recording control unit determines whether or not to record the recording candidate image as the recorded image on the basis of the left undeleted time set for the pixel of the writing region that has been erased.

(12)

The information processing apparatus according to (11), in which the recording control unit does not record the recording candidate image as the recorded image in a case where the left undeleted time set for the pixel of the writing region that has been erased is shorter than a predetermined time.

(13)

The information processing apparatus according to (12), in which the recording control unit records the writing region in which the left undeleted time is shorter than the predetermined time as a memo image different from the recorded image.

(14)

The information processing apparatus according to any one of (1) to (13), further including:

an image extraction unit that extracts the writing image from a captured image obtained by imaging the writing object.

(15)

The information processing apparatus according to (14), in which the captured image is one frame of a moving image.

(16)

The information processing apparatus according to (14), in which the captured image is a still image.

(17)

An information processing method performed by an information processing apparatus, the method including:

setting, in a writing image that includes written information written on a writing object, a writing region that includes the written information; and controlling recording of the writing image in response to a change in the writing region.

(18)

A program for causing a computer to execute processing including:

setting, in a writing image that includes written information written on a writing object, a writing region that includes the written information; and controlling recording of the writing image in response to a change in the writing region.

REFERENCE SIGNS LIST

1 Board writing recording system
10 Information processing apparatus
20 Input device
30 Output device
51 Image acquisition unit
52 Board writing image extraction unit
53 Board writing region setting unit
54 Recording control unit
55 Recording unit
56 Output control unit
61 Mode setting unit
161 Pixel information setting unit

The invention claimed is:

1. An information processing apparatus, comprising:
a central processing unit (CPU) configured to:
acquire a captured image that includes a writing object, wherein the writing object includes written information;
extract a board writing image from the captured image;
set a first writing region in the extracted board writing image;
determine a first increase in the first writing region;
update, with the extracted board writing image, a first recording candidate image, wherein
the first recording candidate image is updated based on the determined first increase in the first writing region, and
the first recording candidate image is a candidate for a recorded image;
determine reduction in the first writing region; and
control, based on the determined reduction in the first writing region, record of the updated first recording candidate image as the recorded image.

2. The information processing apparatus according to claim 1, wherein the first writing region indicates a proportion of a range where the written information is written to the writing object.

3. The information processing apparatus according to claim 2, wherein the CPU is further configured to:
perform expansion processing on the written information in the extracted board writing image; and
set the first writing region based on the performed by performing expansion processing on the written information in the writing image.

4. The information processing apparatus according to claim 3, wherein the CPU is further configured to perform resolution reduction processing on the extracted board writing image in which the first writing region is set.

5. The information processing apparatus according to claim 1, wherein the CPU is further configured to:
perform character recognition in the extracted board writing image; and
set, based on the performed character recognition, a character region as the first writing region.

6. The information processing apparatus according to claim 1, wherein the CPU is further configured to control record of a second recording candidate image as the recorded image, wherein the second recording candidate image excludes the first writing region.

7. The information processing apparatus according to claim 6, wherein the CPU is further configured to:
determine that a part of a second writing region is left undeleted after the updated first recording candidate image is recorded, wherein
the second writing region corresponds to the first writing region after the determined reduction;
determine a second increase in the second writing region after the determination that the part of the second writing region is left undeleted;
mask the part of the second writing region that is left undeleted; and
update the first recording candidate image with a first writing image, wherein
the first writing image includes the masked part of the second writing region that is left undeleted, and
the first writing image corresponds to the second recording candidate image that is left undeleted is masked.

8. The information processing apparatus according to claim 7, wherein the CPU is further configured to:
set a recorded flag for a pixel of the part of the second writing region that is left undeleted;
mask the recorded flag; and
update the first recording candidate image with a second writing image, wherein
the second writing image includes the masked recorded flag, and
the second writing image is associated with the extracted board writing image.

9. The information processing apparatus according to claim 1, wherein the CPU is further configured to:
determine a left undeleted time of a second writing region, wherein
the second writing region corresponds to the first writing region after the determined reduction; and
determine, to record the updated first recording candidate image as the recorded image, based on the determined left undeleted time of the second writing region, wherein
the determination to record the updated first recording candidate image as the recorded image is after the determination of the reduction in the first writing region.

10. The information processing apparatus according to claim 9, wherein the CPU is further configured to:
set the left undeleted time for each pixel of the second writing region; and
determine, based on the left undeleted time, to record the updated first recording candidate image as the recorded image.

11. The information processing apparatus according to claim 10, wherein the CPU is further configured to:
determine the left undeleted time is shorter than a specific time; and
control, based on the determination that the set left undeleted time is shorter than the specific time, not to record the updated first recording candidate image as the recorded image.

12. The information processing apparatus according to claim 11, wherein the CPU is further configured to:
control, based on the determination that the left undeleted time is shorter than the specific time, record of the second writing region as a memo image, wherein
the memo image is different from the recorded image.

13. The information processing apparatus according to claim 1, wherein the captured image is one frame of a moving image.

14. The information processing apparatus according to claim 1, wherein the captured image is a still image.

15. An information processing method performed by an information processing apparatus, the method comprising:
acquiring a captured image that includes a writing object, wherein the writing object includes written information;
extracting a board writing image from the captured image;
setting a writing region in the extracted board writing image;
determining an increase in the writing region;
updating, with the extracted board writing image, a recording candidate image, wherein
the recording candidate image is updated based on the determined increase in the writing region, and
the recording candidate image is a candidate for a recorded image;
determining reduction in the writing region; and
controlling, based on the determined reduction in the writing region, record of the updated recording candidate image as the recorded image.

16. A non-transitory computer-readable medium having stored thereon, computer executable instructions, which when executed by a computer, cause the computer to execute operations, the operations comprising:
acquiring a captured image that includes a writing object, wherein the writing object includes written information;
extracting a board writing image from the captured image;
setting a writing region in the extracted board writing image;
determining an increase in the writing region;
updating, with the extracted board writing image, a recording candidate image, wherein
the recording candidate image is updated based on the determined increase in the writing region, and
the recording candidate image is a candidate for a recorded image;
determining reduction in the writing region; and
controlling, based on the determined reduction in the writing region, record of the updated recording candidate image as the recorded image.

* * * * *